US006980315B2

(12) United States Patent
Komatsu et al.

(10) Patent No.: US 6,980,315 B2
(45) Date of Patent: Dec. 27, 2005

(54) DATA PROCESSING DEVICE FOR CAMERA-INTEGRATED VTR, PRINTER THEREOF, AND METHOD FOR OPERATING THE PRINTER

(75) Inventors: Kouji Komatsu, Kanagawa (JP); Seiichi Morikawa, Kanagawa (JP); Yukihiro Kato, Kanagawa (JP); Keikichi Chiba, Chiba (JP); Junya Ishihara, Aichi (JP); Yoshinari Higuchi, Tokyo (JP); Hajime Ishimitsu, Saitama (JP); Toshimitsu Kubodera, Kanagawa (JP); Masato Yamaguchi, Kanagawa (JP); Yoichi Miyajima, Tokyo (JP); Hiroyuki Ohyama, Tokyo (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 09/765,005

(22) Filed: Jan. 18, 2001

(65) Prior Publication Data

US 2001/0017714 A1    Aug. 30, 2001

(30) Foreign Application Priority Data

Jan. 19, 2000 (JP) ............................. 2000-010401
Mar. 17, 2000 (JP) ............................. 2000-075940

(51) Int. Cl.$^7$ ......................................... G06F 15/00
(52) U.S. Cl. .................. 358/1.16; 358/1.13; 358/1.14; 358/296
(58) Field of Search ................... 358/1.15, 1.13–1.14, 358/401, 403, 296, 503; 348/207.2, 374–376

(56) References Cited

U.S. PATENT DOCUMENTS 5,493,409 A * 2/1996 Maeda et al. ............... 358/296
6,674,538 B2 * 1/2004 Takahashi .................. 358/1.15
6,750,901 B1 * 6/2004 Silverbrook ............. 348/207.2

* cited by examiner

Primary Examiner—Twyler Lamb
(74) Attorney, Agent, or Firm—Frommer Lawrence & Haug LLP; William S. Frommer; Thomas F. Presson

(57) ABSTRACT

A camera-integrated VTR system including a printer embodying a data processing device of the invention is provided, wherein various external data supplied from an external device and internal data generated or recorded internally are enabled to be exchanged selectively, easily and directly between respective components of the system without use of any additional component therebetween so as to be printed instantaneously. The printer of the camera-integrated VTR system comprises a picture display device; a memory device for storing a still picture displayed on the picture display device; and a print operation button for operating the printer, wherein the print operation button is a pushbutton switch which has two modes of states of a half-depressed mode and a full-depressed mode; and wherein the half-depressed mode of the print operation button allows for a portion of pictures displayed on the display device to be selected as a print picture and stored in the memory device; and the full-depressed mode of the print operation button allows to start printing of the print picture.

6 Claims, 19 Drawing Sheets

DATA PROCESSING DEVICE FOR CAMERA-INTEGRATED VTR, PRINTER THEREOF, AND METHOD FOR OPERATING THE PRINTER

BACKGROUND OF THE INVENTION

1. Field of the Invention

The present invention relates to a data processing device for a camera-integrated VTR (video tape recorder) which includes a printer unit, and features a selective and easy printing of a portion of pictures selected from various data of pictures entered from an externally connected device, picture data taken by a camera or other data recorded in a video tape.

2. Description of the Related Art

There is known a printer equipped with a picture display device, in which one frame image of motion pictures displayed on the picture display device is selected to print a picture of the selected one frame image (still picture).

In such printer, usually there are separately provided with two switches, one is for selecting any one frame image of motion pictures as a printing still picture and for storing data for the selected one frame image into a memory, and the other is for starting a printing operation of the printer.

This type of printer having two switches, however, has such a problem that because the printer requires two actions; one for selecting a still picture to print from among motion pictures, and the other for starting the printing for the selected still picture, must be done sequentially. Accordingly the operation becomes complicated.

Conventionally, using such a camera-integrated VTR (video tape recorder) as one example of the data processing device and a printer to be coupled to the camera-integrated VTR in combination, if it is required to print one frame image taken by a video camera or from pictures reproduced from a video tape, there is such a problem that complicated steps of operation are required prior to starting the printing operation such as, for example, interconnection between respective camera-integrated VTR and printer, connection to a power supply to the respective devices, supply of a printing paper to the printer and the like.

Namely, there are required, needless to mention, connections of its video camera and its printer to a power supply, and a connection between an output terminal of the video camera and an input terminal of the printer, and further because one frame image to be printed by the printer must be a still picture, and accordingly additional works to capture a still picture among motion video pictures are required. Such motion pictures are supplied by the video camera or by the VTR by reproducing motion pictures recorded in the video tape, then the data of the captured still picture is transferred to the printer as a printing data. After that the printing data received as above is used to print the captured still picture by the printer.

SUMMARY OF THE INVENTION

The present invention has been contemplated to solve the above-mentioned problems associated with a conventional method for printing a still picture image.

An object of the present invention is therefore to enable for one single switch to perform a series of operations from selection of an appropriate still picture image of motion pictures as a printing still picture to actually starting the printing operation for the selected still picture, thereby substantially simplifying the operation of its print operation button.

In order to solve the above-mentioned problems, this invention relates to a printer equipped with a picture display device to print a selected one still picture image on a printing paper, where selected one still picture image is displayed on the picture display device. The printer of the present invention comprises a memory means for storing printing data for a still picture image displayed on the picture display device and a print operation button for starting the printing operating of the printer. The above-mentioned print operation button is a push type switch having two modes of states and functions such as a half-depressed state and a full-depressed state. The half-depressed state of the print operation button causes to select one still picture image, display thus selected still picture image on the picture display device and store the data for the selected still picture image in the memory. The full-depressed state of the print operation button causes to start printing of the still picture thus selected and stored.

Therefore, the single print operation button provided on the printer of the present invention is able to perform a series of operations including selection of a printing still picture from motion pictures and starting the printing operation of the printer, thereby simplifying its operations substantially.

Further, a method of printing operation according to the invention comprises step for printing on a printing paper a still picture image selected from among motion pictures displayed on the display device by the printer provided with a single push button switch having two modes of states and functions such as a half-depressed state and a full-depressed state. The method of the present invention further comprises the steps of: depressing the push button switch up to half way to select a still picture image from motion pictures displayed on the display and to store the same as a printing picture; and depressing the push button switch fully to its bottom to start printing of the still picture image thus stored in the memory.

Therefore, according to the method of printing operation of the present invention, only single print operation button is capable of performing a series of printer operations including selection of the print picture (still picture image) among motion pictures and starting of printing operation of the printer, thereby simplifying the series of complicated print operations substantially.

Another object of the invention is to provide for a data processing device for implementing a camera-integrated VTR equipped with a printer unit, in which various external data entered from various external devices, and internal data generated or stored therein are ensured to be communicated selectively and with ease between respective units without need of provision of other units therebetween.

In order to accomplish the above-mentioned another object of the present invention, a data processing device a camera-integrated VTR equipped with a printer unit is provided, which is comprised of a data I/O unit, a data memory unit and a data processing unit, wherein the data I/O unit, the data memory unit and the data processing unit are connected in parallel to a data bus so that respective units are allowed to transmit and receive data therebetween selectively, directly and with ease without need of provision of other units therebetween.

Thereby, a selective and arbitrary data transfer between respective units that are arranged in parallel on the data bus is ensured to be established.

BRIEF DESCRIPTION OF THE DRAWINGS

Other features and advantages of the invention will be apparent from the following description taken in connection with the accompanying drawings, wherein.

PREFERRED EMBODIMENTS OF THE INVENTION

Figure 1:
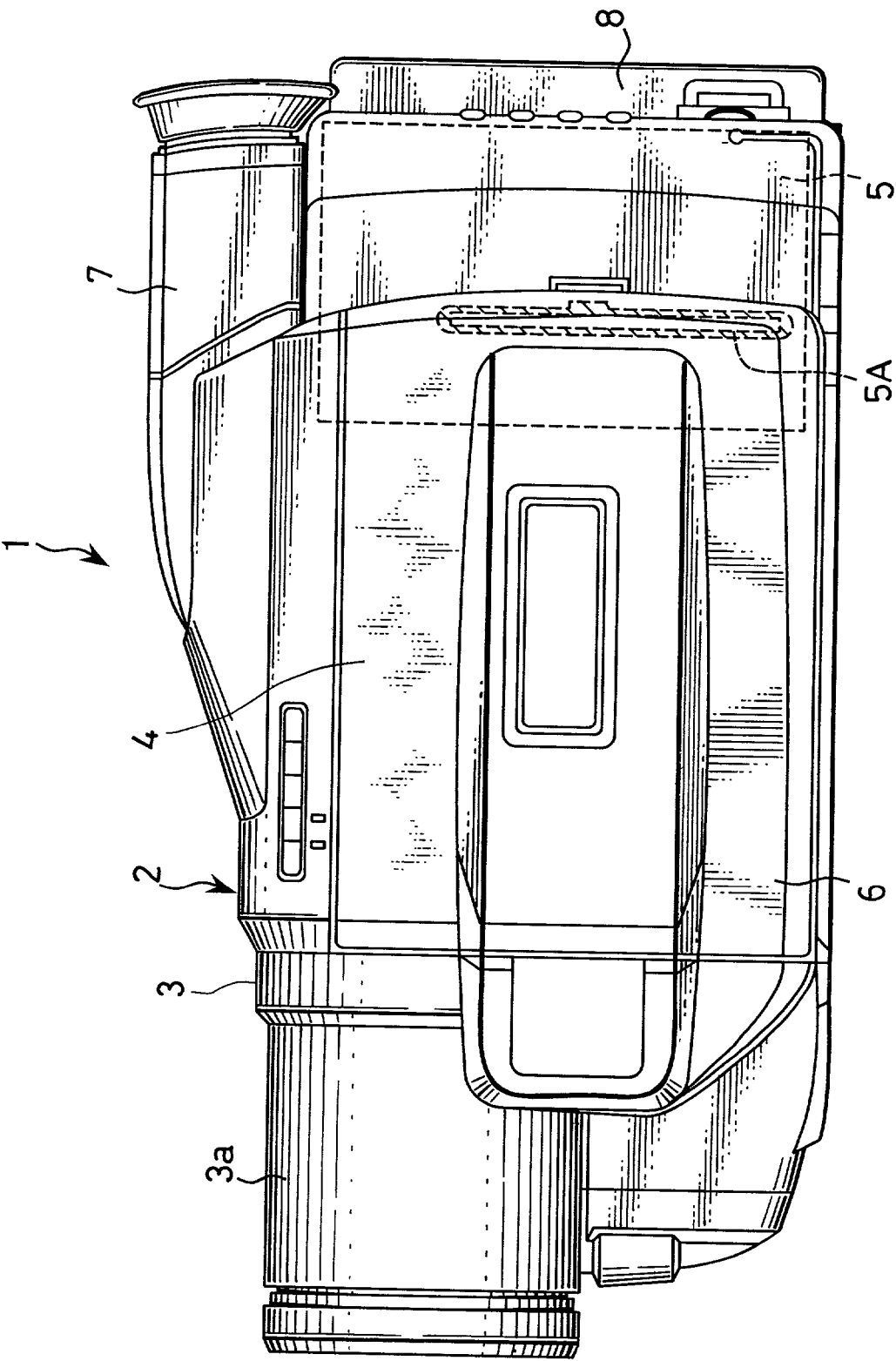
FIG. 1 is a side view of a camera-integrated VTR including a printer of the present invention.

A data processing device for a camera-integrated VTR, a printer thereof and a method for operating the printer according to a preferred embodiment of the present invention will be described more in detail with reference to the accompanying drawings as follows. The data processing device of the present invention depicted in the drawings is an example applied for implementing a camera-integrated video tape recorder equipped with a printer (hereinafter referred to as a camera-integrated VTR).

Figure 2:
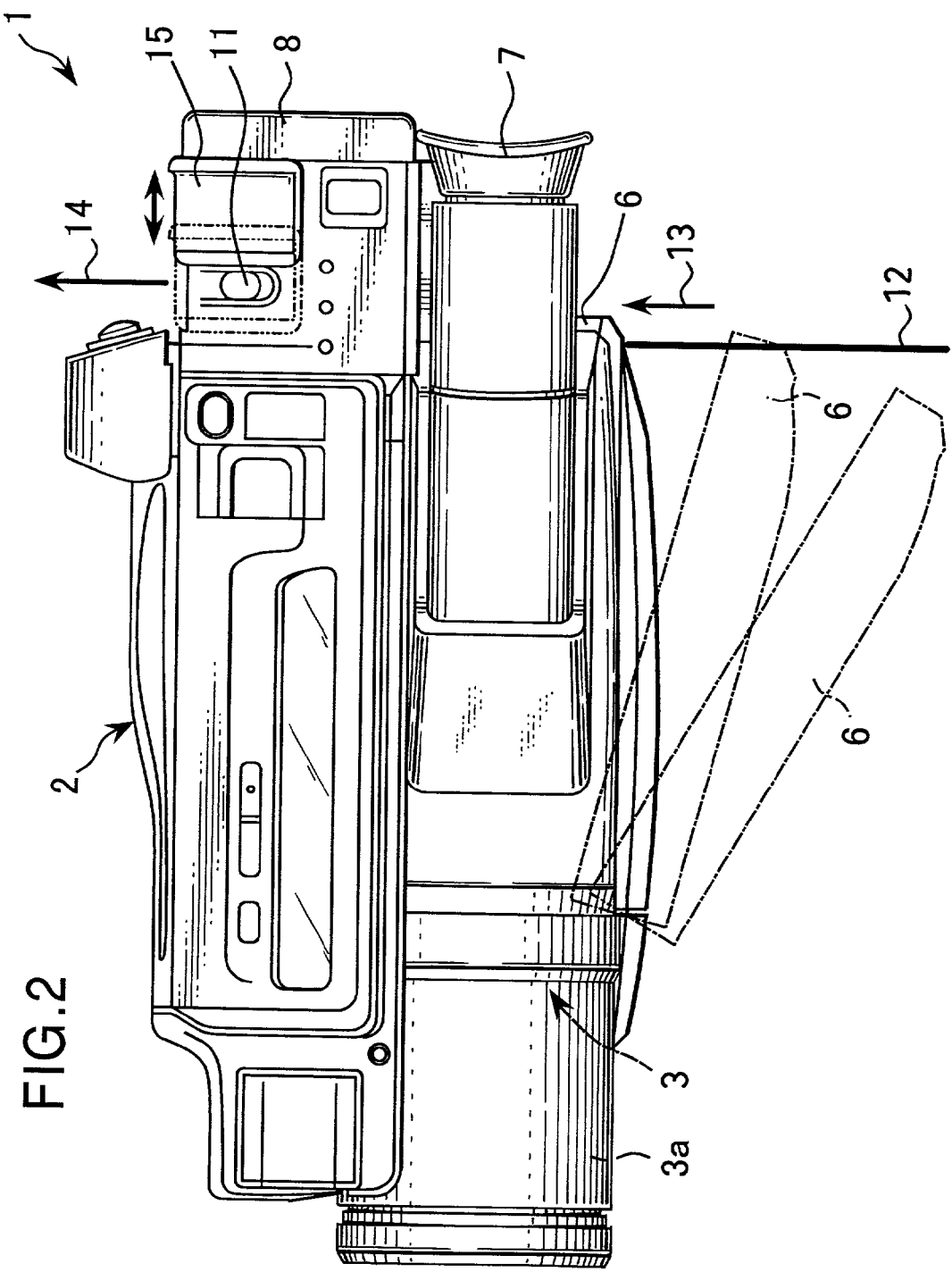
FIG. 2 is a plan view of the camera-integrated VTR of FIG. 1 as seen from the above.
Figure 3:
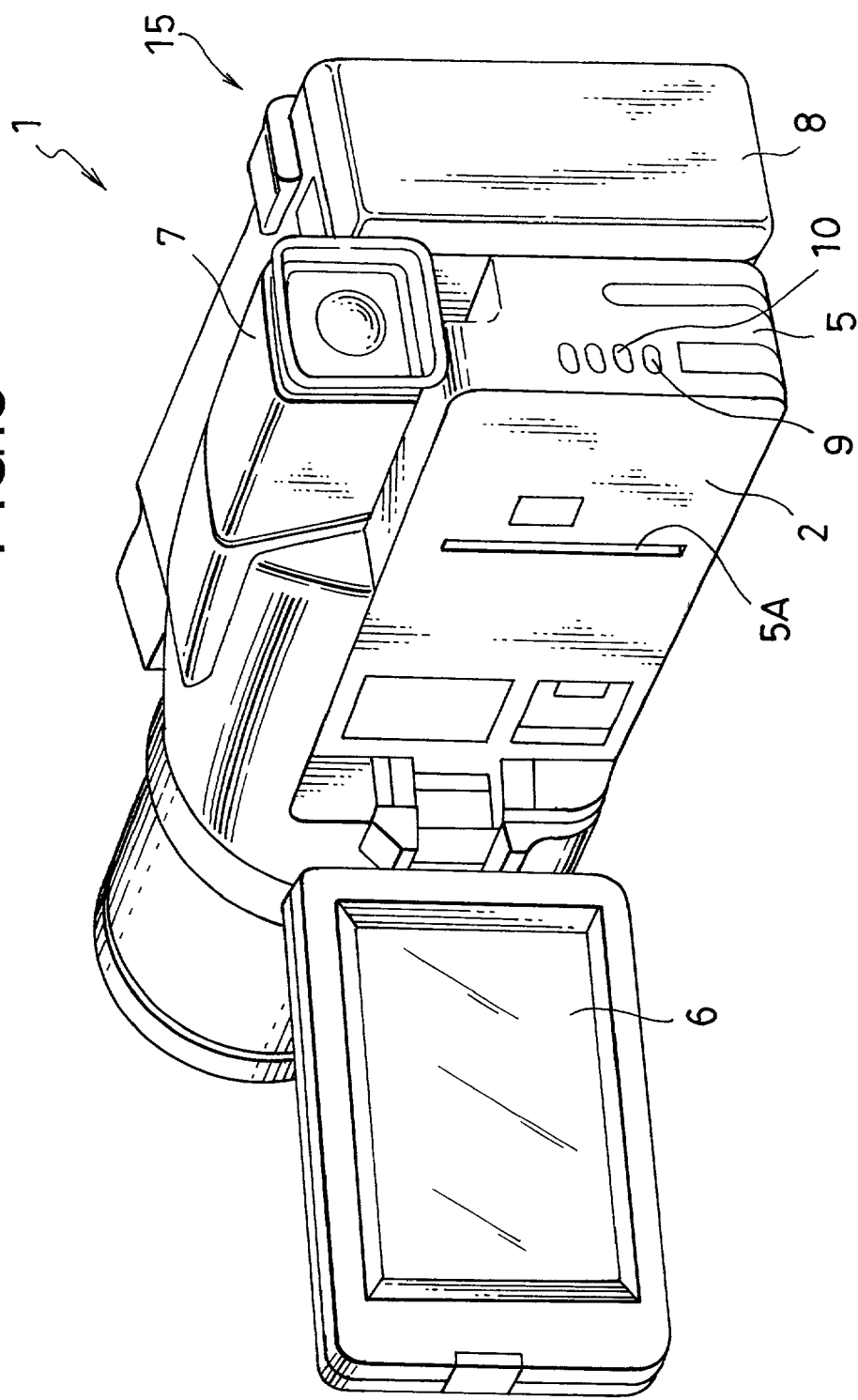
FIG. 3 is a perspective view of the camera-integrated VTR of FIG. 1 with a LCD panel opened.

FIGS. 1 and 2 show an external view of a camera-integrated VTR 1.

The camera-integrated VTR 1 has a taking lens 3a, a camera unit 3 including an image pick-up element and the like (not indicated), and a video tape recorder unit 4 (hereinafter referred to as a VTR unit), all of which are contained in a housing of a body 2.

Further, in a rear portion of the body 2, a printer unit 5 is integrated. Still further, a LCD (liquid crystal display) panel 6 is rotatably mounted on a left-hand side of the body 2, and a viewfinder 7 is mounted on an upper side of the body 2, respectively.

By way of example, the LCD panel 6 is opened as indicated by a two-dot chain line when in use, and is closed as indicated in FIGS. 1 and 2 when not in use.

Furthermore, a battery 8 is installed to a rear side of the body 2 for supplying a operating power to respective portions of the camera-integrated VTR 1 including the printer unit 5 at the time of a portable use, and also on the rear side of the body 2, there are provided a line I/O (input and output) connector 9 and a so-called IEEE-1394 connector 10 of the IEEE (Institute of Electrical and Electronics Engineers) standards for data exchange with an external device.

Still further, on an upper rear side of the body 2, there is disposed a print switch 11 for instructing the printer unit 5 to start a printing operation.

In the camera-integrated VTR 1, when a printing work is performed by the printer unit 5 in response to the operation of the above-mentioned print switch 11, a printing sheet 12 is pulled from a feeder port 5A inside the printer unit 5 in a direction of an arrow 13 as indicated in FIG. 2, then after completion of the printing operation, a printed sheet is discharged from a discharge port 5B in a direction of an arrow 14.

It is arranged according to the present invention such that only when the LCD panel 6 is opened, the feeder port 5A is exposed, i.e., unless the LCD panel 6 is opened, the printing sheet 12 is not allowed to be inserted into the printer 5, nor the printer 5 is allowed to operate. This arrangement is provided for preventing undesirable intrusion of dust through the sheet feeder port 5A when the printer 5 is not in use, and in consideration of a probability that the use of the printer 5 is in most cases during browsing and selection of a printing still picture using the LCD panel 6.

Figure 4:
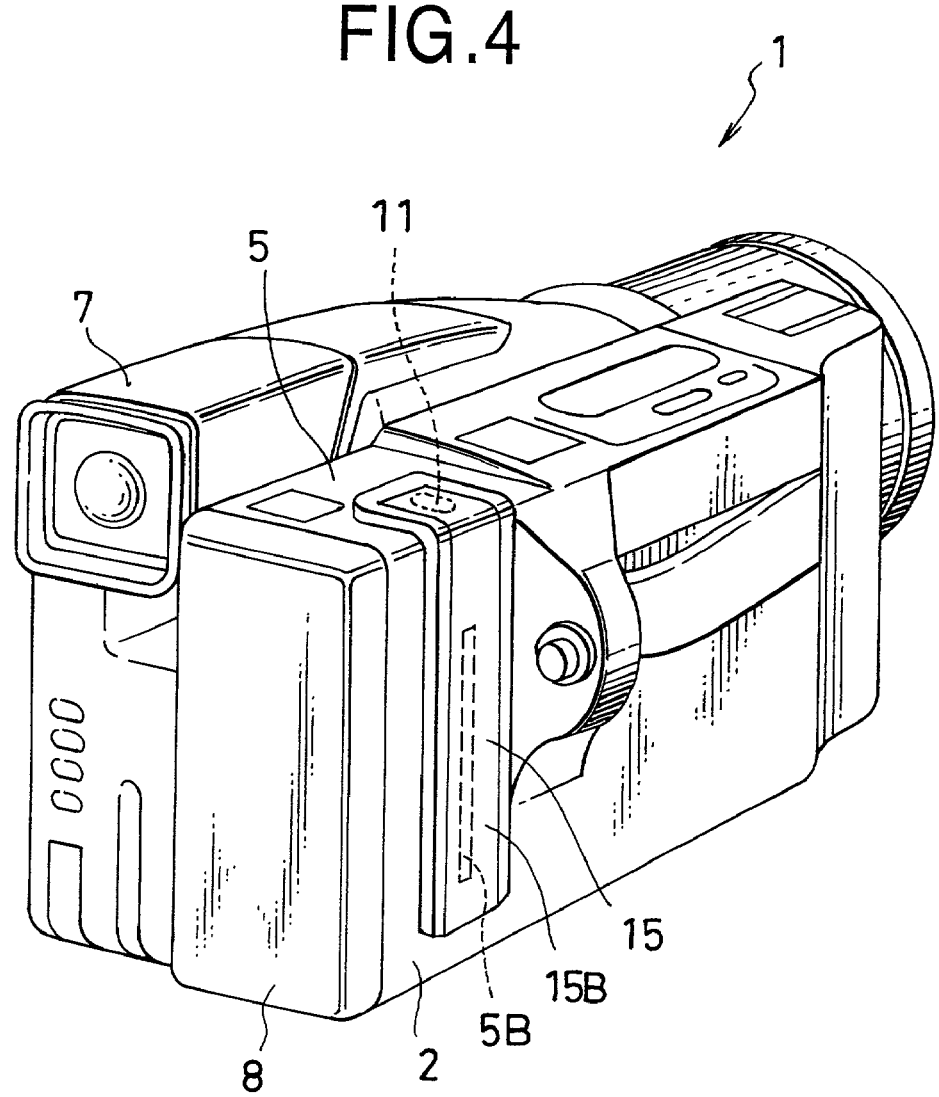
FIG. 4 is a perspective view of the camera-integrated VTR as seen from a rear side opposite to the LCD panel.
Figure 5:
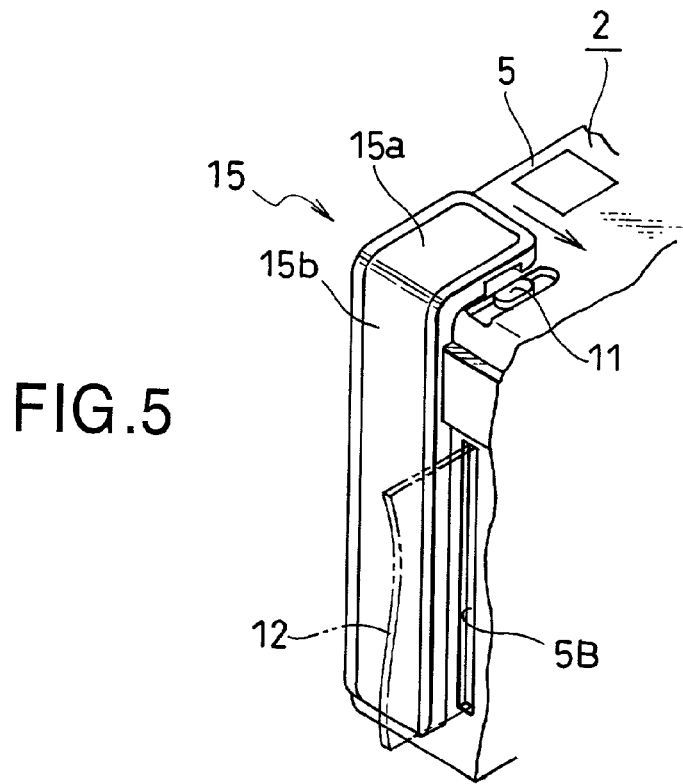
FIG. 5 is a perspective frontal view of portions of a print operation button, a printing paper discharge port and a slide cover which is opened.

At a position on the body 2 opposite to the sheet feeder port 5A of the printer unit 5, there is provided the above-mentioned discharge port 5B in such a manner to allow for an edge portion of the printing sheet 12 in the process of printing to protrude and withdraw to and from the body 2 (refer to FIGS. 4 and 5). This arrangement is provided for allowing the printing sheet 12 to move in reciprocating directions during printing sequences in the printer 5, and also for the reason that a width of the printing sheet 12 becomes comparatively broader with respect to a width of the body 2 which is reduced significantly in size as a result of a more and more compact design of the device.

The print switch 11 for operating the printer 5 is provided in an upper direction of the sheet discharge port 5B and on the upper side of the body 2 (refer to FIGS. 2, 4 and 5).

The above-mentioned sheet discharge port 5B is closed by a slide cover 15 (refer to FIGS. 4 and 5).

The slide cover 15 is formed in a reversed L-shape as seen from the rear side of the body 2, with a short side 15a of which disposed overlapping in part the upper side of the body 2 and with a long side 15b of which disposed overlapping in part the side of the body 2 opposite to the LCD panel 6, and the slide cover 15 is supported free to slide in directions back and forth.

Figure 6:
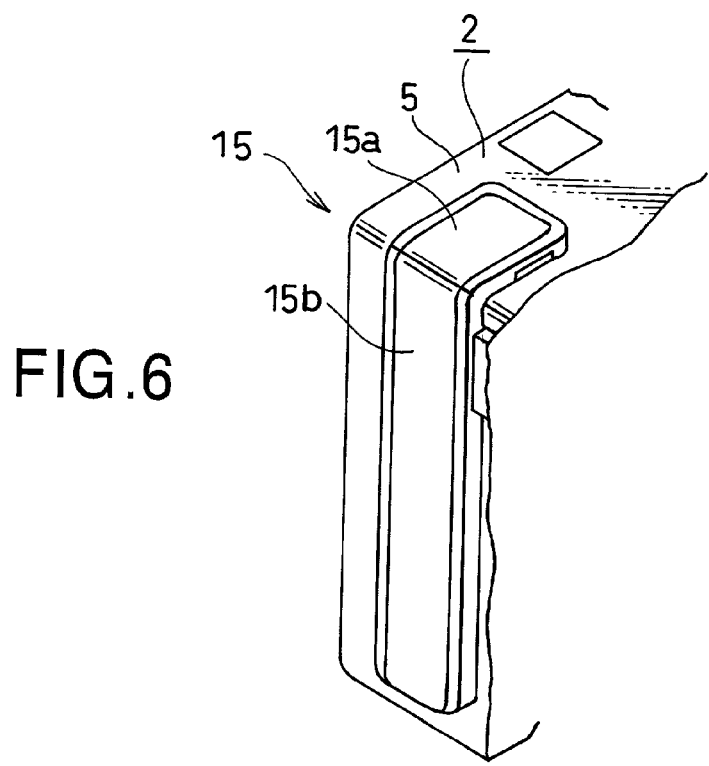
FIG. 6 is a perspective frontal view the same as FIG. 5, however, with the slide cover closed.

When the slide cover 15 moves to its frontal position along its path, the long side 15b thereof closes the discharge port 5B, and when closing the slide cover 15, it moves to its backward position, then the discharge port 5B becomes exposed (see FIGS. 5 and 6).

Further, in a condition in which the closing cover 15 closes the discharge port 5B, the short side 15a of the slide cover 15 is caused to cover the print switch 11 (see FIG. 6). Thereby, it is arranged such that when closing, the slide cover 15 conceals both the discharge port 5B and the print switch 11 simultaneously. Therefore, in such closed state of the discharge port 5B, the print switch 11 is protected of its operation.

The above-mentioned print switch 11 is a push button switch which has two-mode states such as a half-depressed state and a full-depressed state. By this two-mode state operation, a step of selection of a printing still picture from motion pictures as well as a step to actuate the printing operation are ensured to be performed as will be described later.

Figure 7:
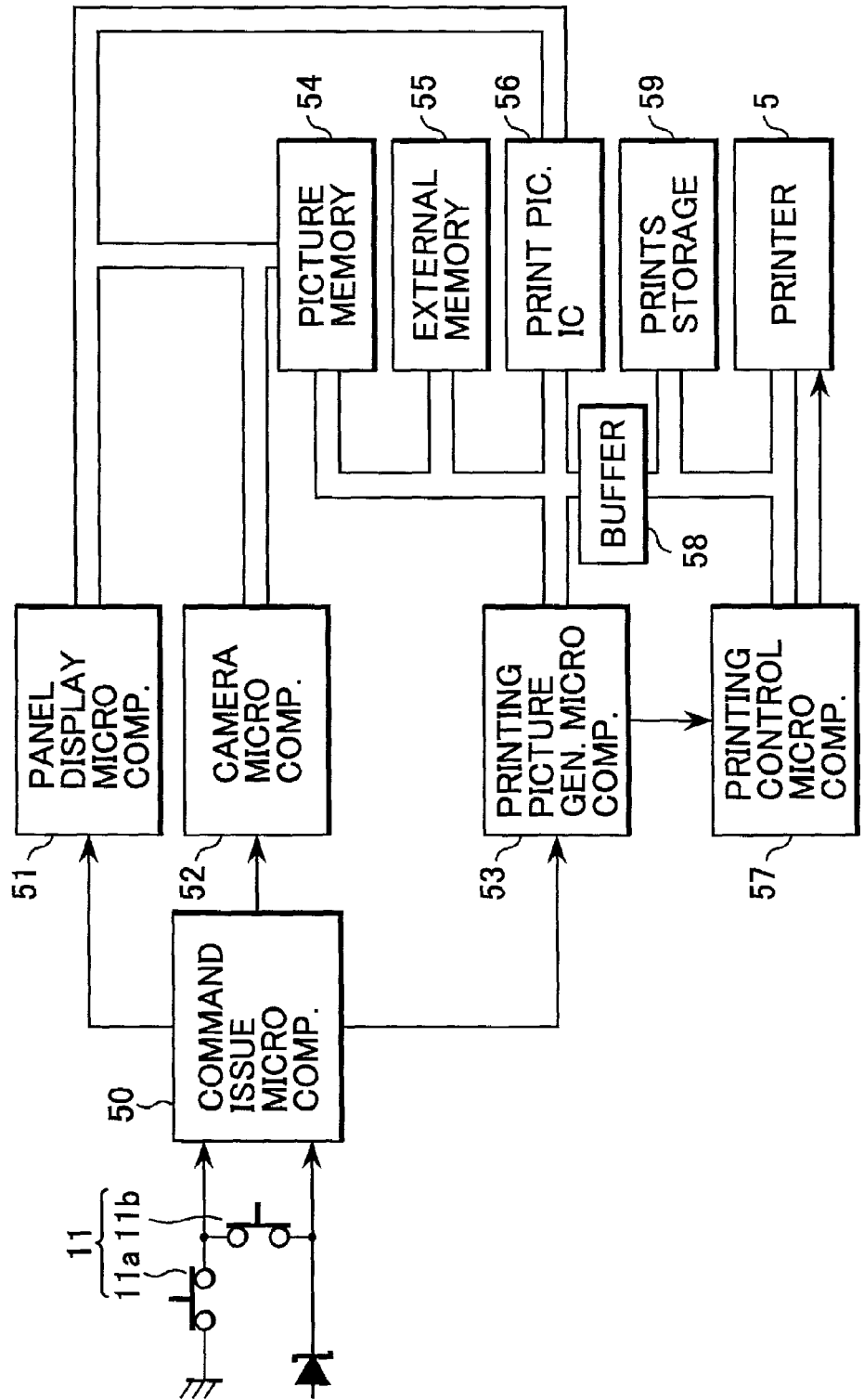
FIG. 7 is a circuit block diagram for controlling an operation of the printer.

FIG. 7 is a block diagram showing a control portion for controlling the operations to select and store a printing still picture as well as to actuate the printer 5 to start the printing operation.

The print switch 11 can be described equivalently using a first switch 11a and a second switch 11b. When the print switch 11 is operated, a signal indicating the mode selected in response to its operation is entered into a command issue micro-computer 50. An on-state of only the first switch 11a is conducted by the half-depressed state of the print switch 11, and an on-state of both the first switch 11a and the second switch 11b is conducted by the full-depressed state of the print switch 11.

The command issue micro-computer 50 issues a predetermined signal to a panel display micro-computer 51, a camera micro-computer 52 and a printing picture generation micro-computer 53, respectively in response to the signal of the mode generated by the print switch 11.

In response to the signal issued from the command issue micro-computer 50, the panel display micro-computer 51 instructs to display a still picture data stored in a picture memory 54 as a picture on the LCD panel 6.

The picture memory 54 is provided for temporarily storing a picture data of a still picture selected among motion pictures.

In response to the signal issued from the command issue micro-computer 50, the camera micro-computer 52 instructs the picture memory 54 to store the data for the still picture selected from motion pictures displayed on the LCD panel 6 as a picture data of a still picture to be printed.

In response to the signal issued from the command issue micro-computer 50, the print picture generation micro-computer 53 instructs a print picture generation IC 56 to convert the picture data stored in the picture memory 54, an external memory unit 55 or the like to a printing data, and also instructs a print control micro-computer 57 to start the printing operation.

The picture data converted to the printing data by the print picture generation IC 56 is stored in a print picture store memory 59 via a buffer 58. In response to an instruction from the print control micro-computer 57, the picture data stored in the print picture store memory 59 is transferred to the printer 5 for printing the still picture on the printing sheet 12.

Figure 8:
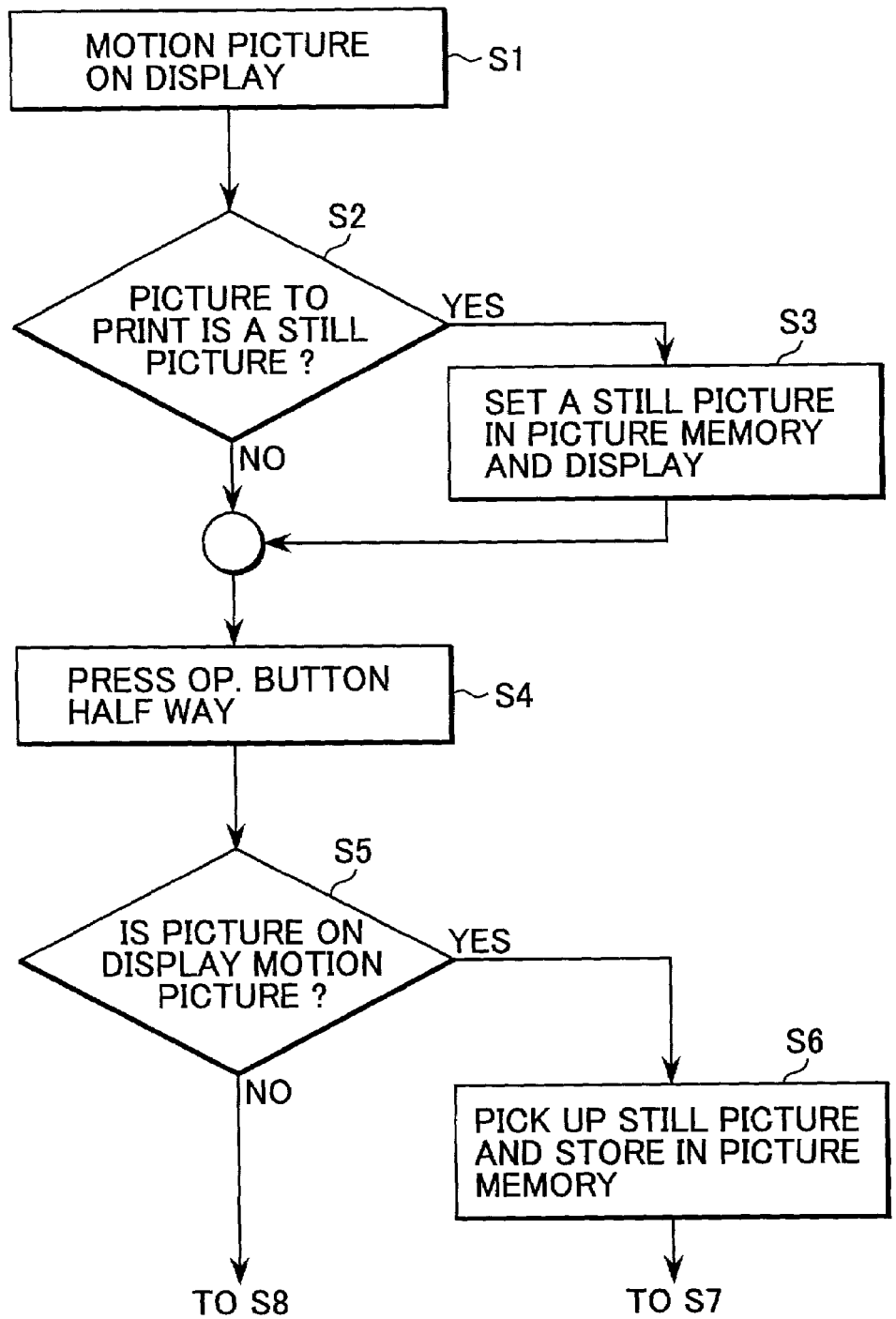
FIG. 8 is a flowchart of operations to explain steps S1 to S6.
Figure 9:
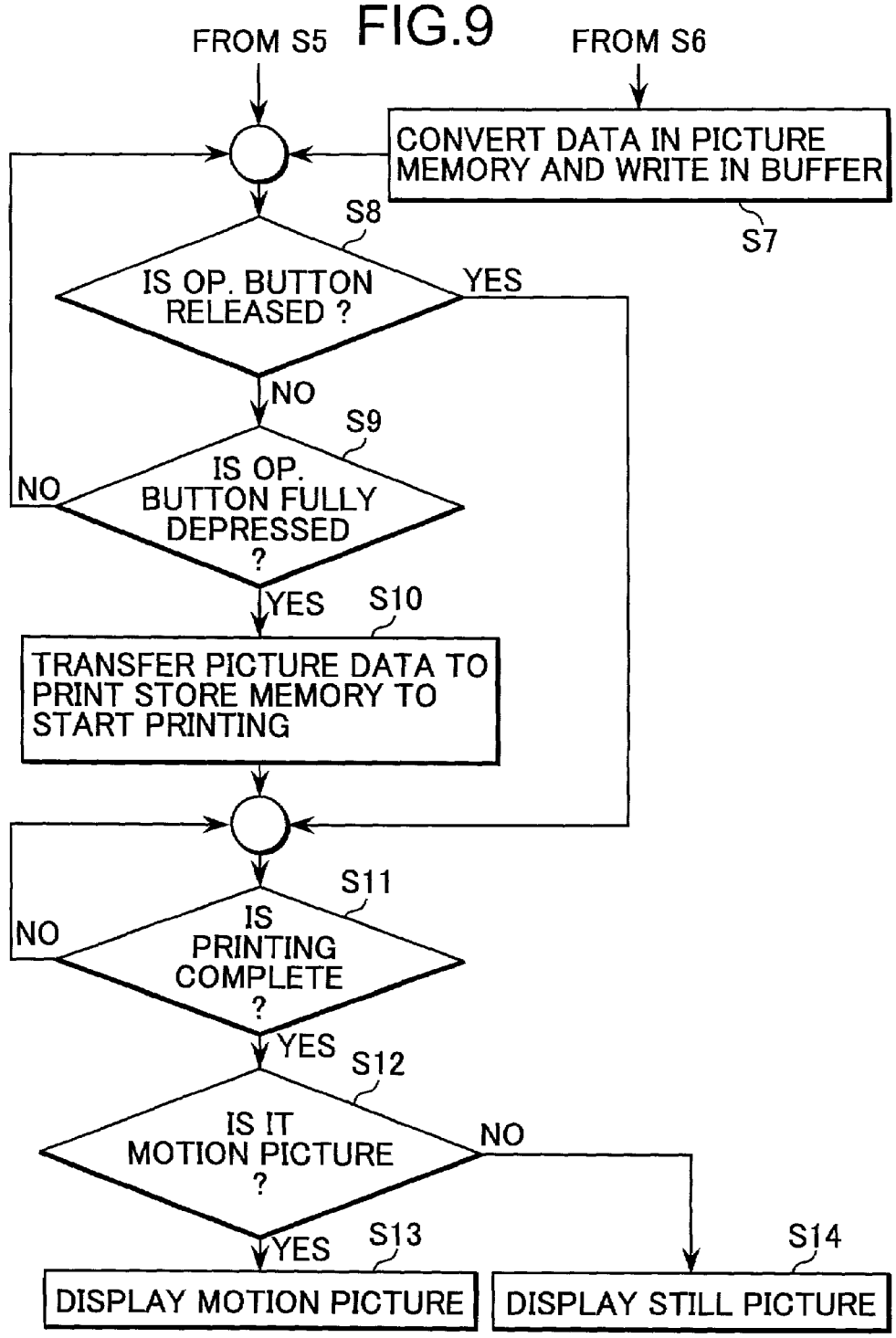
FIG. 9 is a flowchart of operations to explain steps S7 to S17.

Print start operations with respect to motion pictures and still pictures will be described in detail with reference to FIGS. 8, 9 and flowcharts thereof.

A step S1 indicates such a case in which motion pictures are displayed on the LCD panel 6, and these motion pictures on display are so-called an EE (Electronic to Electronic) mode display pictures available in the camera-integrated VTR 1, and this mode is not a record mode nor playback mode. Therefore, these motion pictures are displayed in a through state in which the motion pictures of an object taken by the taking lens 3a is converted into an electrical signal through a CCD (charge coupled device) or the like, and thus obtained electrical signal is directly displayed on the LCD panel 6 as a motion picture.

By way of example, because of large power consumption by the printer 5, it may cause an instability during a battery-driven operation if a printing work is performed simultaneously with the record mode or playback mode picture displays. Therefore, it is preferable that an arbitrary portion of motion pictures selected as a printing still picture during the record mode or the playback mode displays is once stored in the memory 59, then the printing still picture is printed by the printer 5 under an external power supply via an AC adapter or the like.

Also, in this condition described above, the print switch 11 is off-state, namely, the first switch 11a and the second switch 11b are both off-state, thereby no signal is entered into the command issue micro-computer 50.

It is determined whether a picture to print is to be selected from the still pictures or from the motion pictures (step S2). In the former case (to be selected from the still pictures), the step moves to a step S3. On the contrary in the latter case (to be selected from the motion pictures), the step moves to step S4. Further, this judge is done by user with a switch (not shown).

The still pictures are entered into the picture memory 54 (step S3), and then displayed sequentially on the LCD panel 6. Such still pictures are obtained from still picture data stored in the external memory device 55 connected to this camera-integrated VTR 1, then retained in the picture memory 54 and displayed on the LCD panel 6.

By way of example, this external memory device 55 includes, for example, a memory card, a memory stick, a hard disk drive and the like. Further, if the pictures are stored also as still pictures in a record medium inside the camera-integrated VTR 1, it may be these still pictures available in this mode in cameral-integrated VTR 1.

The print switch 11 is depressed halfway (step S4). Namely, only the first switch 11a becomes on-state. Thereby, a signal indicating that the print switch 11 is depressed halfway is sent to the command issue micro-computer 50, and in response to this signal, the command issue micro-computer 50 issues a predetermined signal.

It is determined whether a picture to print is to be selected from the still pictures or from the motion pictures (step S5). In the latter case (from the motion pictures), the step advances to step S6, and in the former case (from the still pictures), the step moves to step S8. Determination of the picture to print whether it is from the still pictures or from the motion pictures is done on the basis of the status of the switch selected by the user in step S2. In addition, in the case where its picture to print is from the still pictures, because these still pictures are already stored in the picture memory 54 and its still picture is displayed on the LCD panel 6, no action with respect thereto is taken in the step S5.

The picture to print is selected from the motion pictures, the command issue micro-computer 50 issues a command to the camera micro-computer 52 such that only a portion of pictures at the time when the print operation button 11 is pressed half-way is to be stored as a still picture in the picture memory 54 (step S6). Such a portion of the motion pictures selected thus becomes as one printing still picture. Subsequently, the command issue micro-computer 50 issues a command to the panel display micro-computer 51 so as to display its still picture which is selected from the motion pictures and stored in the picture memory 19, on the LCD panel 6. Then, the step moves to step S7.

The command issue micro-computer 50 issues a command to generate a print picture to the print picture generation micro-computer 53 (step S7). In response to this command, the print picture generation micro-computer 53 converts the picture data stored in the picture memory 54 using the print picture generation IC 56 into a printing data format and transfer the same to the buffer 58. Then, the step moves to step S8.

When the print switch 11 is released from the half-depressed state (step S8), the command issue micro-computer 50 cancels its command and the step moves to step S11. In step S11, completion of the printing operation is confirmed, and when the half-depression state of the print switch 11 is released, the printing is determined apparently to have been completed. By way of example, as will be described later, when selection from the motion pictures is going on in the step S5, that motion pictures are displayed on the LCD panel 6, and when selection from the still pictures is going on in step S5, that still pictures are displayed thereon. Further, when the print switch 11 is released from its halfway-depressed state, the picture data stored in the picture memory 54 is retained as it is. Subsequently, when a new picture data is transferred to the picture memory 54, this new picture data is written and stored. When the print switch 11 is not released from its halfway-depression state, the step moves to step S9.

Full depression or depression to the bottom indicates a state in which both the first switch 11a and the second switch 11b are set to be on-state (step S9). In the case the print switch 11 is not depressed to the bottom, the step returns to step S8 where it is again determined if the half-way depression state is released or not. In case the print switch 11 is full-depressed to the bottom, a signal indicating that the print switch 11 is depressed to the bottom is sent to the command issue micro-computer 50.

In response to a command issued from the command issue micro-computer 50 upon reception of the signal indicating the full-depression state of the print switch 11, the print picture generation micro-computer 53 issues a print instruction to the print control micro-computer 57 (step S10). Then, the print control micro-computer 57 allows the print picture data to be transferred from the buffer 58 to the print picture store memory 59, and drives the printer 5 to start printing thereof. Thereby, the print picture is printed on the printing sheet 12. By way of example, during operation of the printer 5, the LCD panel 6 is caused not to display the picture thereby contributing to power saving. Then, the step advances to step S11.

When the printing operation is over (step S11), the step advances to step S12. When the printing operation is not completed, step S11 is repeated.

When the printed picture is one selected from the motion pictures (step S12), the step advances to step S13. When the printed picture is selected from the still pictures, the step moves to step S14.

After completion of the printing operation, the display on the LCD panel 6 is returned to its previous state as it is at the time of selection of the print picture from among the motion pictures (step S13). Namely, the motion picture being displayed at the time of selection of the print picture is resumed to be displayed.

Likewise step S13, after completion of the printing operation (step S14), the display on the LCD panel 6 is returned to its previous state as it is at the time of selection of the print picture from among the still pictures.

Thereby, because the present embodiment of the invention is applied to the printer 5 of the camera-integrated VTR 1, it can be easily determined whether it is a motion picture or a still picture that is displayed on the LCD panel 6. Thereby, it is easily processed only for the motion picture to be stored in the picture memory 54 (memory unit).

By way of example, in the preferred embodiment of the invention described above, the position of the print switch 11 mounted on the body 2 is described to be concealed by the slide cover 15, however, it is not limited thereto, and it may be arranged to be exposed always on the body 2, or may be hidden by the LCD panel 6. That is, the print switch 11 may be disposed at any position on the body 2 within the scope of the invention.

Further, in printing of the still picture according to the preferred embodiment of the invention described above, it is described that the picture data of the still picture to print is stored once in the picture memory 54, then stored in the print picture store memory 59 prior to printing thereof, however, it is not limited thereto, and also it may be arranged within the scope of the invention such that the picture data of the still picture is read directly from the external memory device 55 that stores the picture data of the same, and after conversion of these picture data into a printing data, the printing data is stored in the print picture store memory 59, and then supplied to the printer 5 for printing thereof.

Incidentally, the camera-integrated VTR 1 embodying the data processing device of the invention is comprised of the data I/O units, data memory unit and data processing unit, wherein the data I/O units, data memory unit and data processing unit are connected in parallel via a data bus so that respective units are allowed to exchange various data selectively and directly therebetween.

More specifically, the data I/O units include a camera portion for taking a picture and an I/O interface portion, the data memory unit includes a VTR portion and a RAM portion (built-in memory and removable memory), the data processing unit includes a printer for printing a picture data, and so on.

Then, these units are arranged such that various data entered from external devices connected via the I/O interface described above, the picture data being taken by the camera portion, and internal data recorded in a video tape in the VTR portion are allowed to be printed selectively and easily. A detailed description of an internal configuration of the camera-integrated VTR embodying the invention will be made in the following with reference to FIG. 10.

A camera portion 3 (data I/O unit) is comprised of a taking lens 3a including pick-up elements (not shown), a camera data processing circuit 21 which is connected via an A/D (analog-to-digital) converter 20 interposed therebetween, and a still picture data processing circuit 22 for capturing a still picture from pictures taken by the taking lens 3a. They are connected via the still picture data processing circuit 22 to a data bus 15.

A VTR portion (data memory unit) 4 is comprised of the still picture data processing circuit 22 which is shared with the camera portion 3, a tape record/reproduce data processing circuit 23 connected to the still picture data processing circuit 22, a record/reproduce amplifier 24 and a video head (not shown) for performing a data recording/reproducing to an from a video tape, connected in the above order. Likewise the camera portion 3, the VTR portion 4 is connected to the data bus 15 via the still picture data processing circuit 22.

The printer portion (data processing unit) 5 is comprised of a printing data transfer interface 26, a printer control micro-computer 27, a print picture data processing memory 28, a printing data processing IC 29, a printer control micro-computer 27, a motor driver IC 30, a printer head driver 31, a printer head 32, and a motor 33. Further, the printer control micro-computer 27 in the printer portion 5 is connected to a still picture device control micro-computer 34. Then, in the printer portion 5, the printing data transfer interface 26, the print picture data processing memory 28, the printing data processing IC 29 and the printer control micro-computer 27 are connected to the data bus 15, respectively.

An input/output interface portion (data I/O unit) 16 is comprised of three types of connector sets which are in compliance with the data I/O standards. Namely, it is comprised of a line I/O connector 9 connected to an input/output signal switch circuit 35, the IEEE-1394 connector 10 connected to an interface IC 36, and a RS-232C (serial) connector 38 connected to a RS-232C interface 37. Then, the line I/O connector 9 is connected via the input/output signal switch circuit 35 and A/D&D/A converter 39 to the tape recording/reproducing signal circuit 23, and also the IEEE-1394 connector 10 is connected via the interface IC 36 to the tape recording/reproducing signal circuit 23, respectively. The RS-232C (serial) connector 38 is connected via the RS-232C interface 37 to the data bus 15. By the way, the still picture data processing circuit 22 and the tape recording/reproducing signal circuit 23 connected to the data bus 15 are allowed to be used by sharing with the I/O interface portion 16.

The RAM portion 17 which is one of the data memory units is comprised of a built-in memory 18 installed inside the body 2, and a so-called memory stick approximately in a bar-like shape. The built-in memory 18 is directly connected to the data bus 15, and a removable memory 19 is connected to the data bus 15 via a removable memory connector 40 and a memory interface 41.

Therefore, the data bus 15 establishes a mutual connection between respective portions described above, namely, between the still picture data processing circuit 22, the still picture device control micro-computer 34, the RS-232C interface 37, the still picture data memory 42 for temporarily holding the still picture, a removable memory interface 41, the built-in memory 18, the printing data transfer interface 26, the print picture data process memory 28, the printing data processing IC 29, and the printer control micro-computer 27. Thereby, the data I/O unit (camera portion 3, I/O interface portion 16), the data store unit (VTR portion 4, built-in memory 18, removable memory 19), and the data processing unit (printer portion 5) are connected in parallel by the data bus 15.

Figure 10:
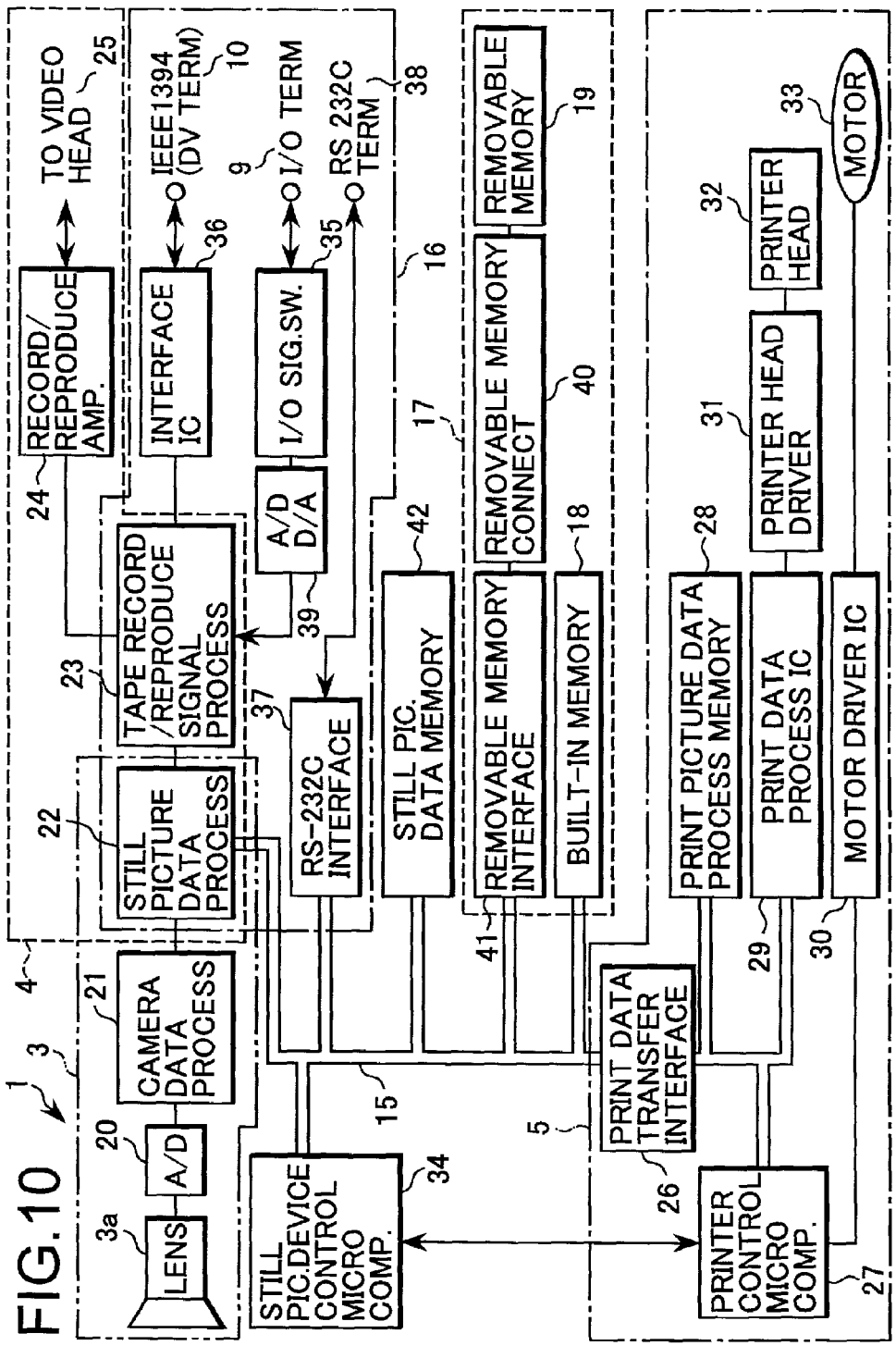
FIG. 10 is a schematic block diagram indicating a system configuration of the camera-integrated VTR of the invention.
Figure 11:
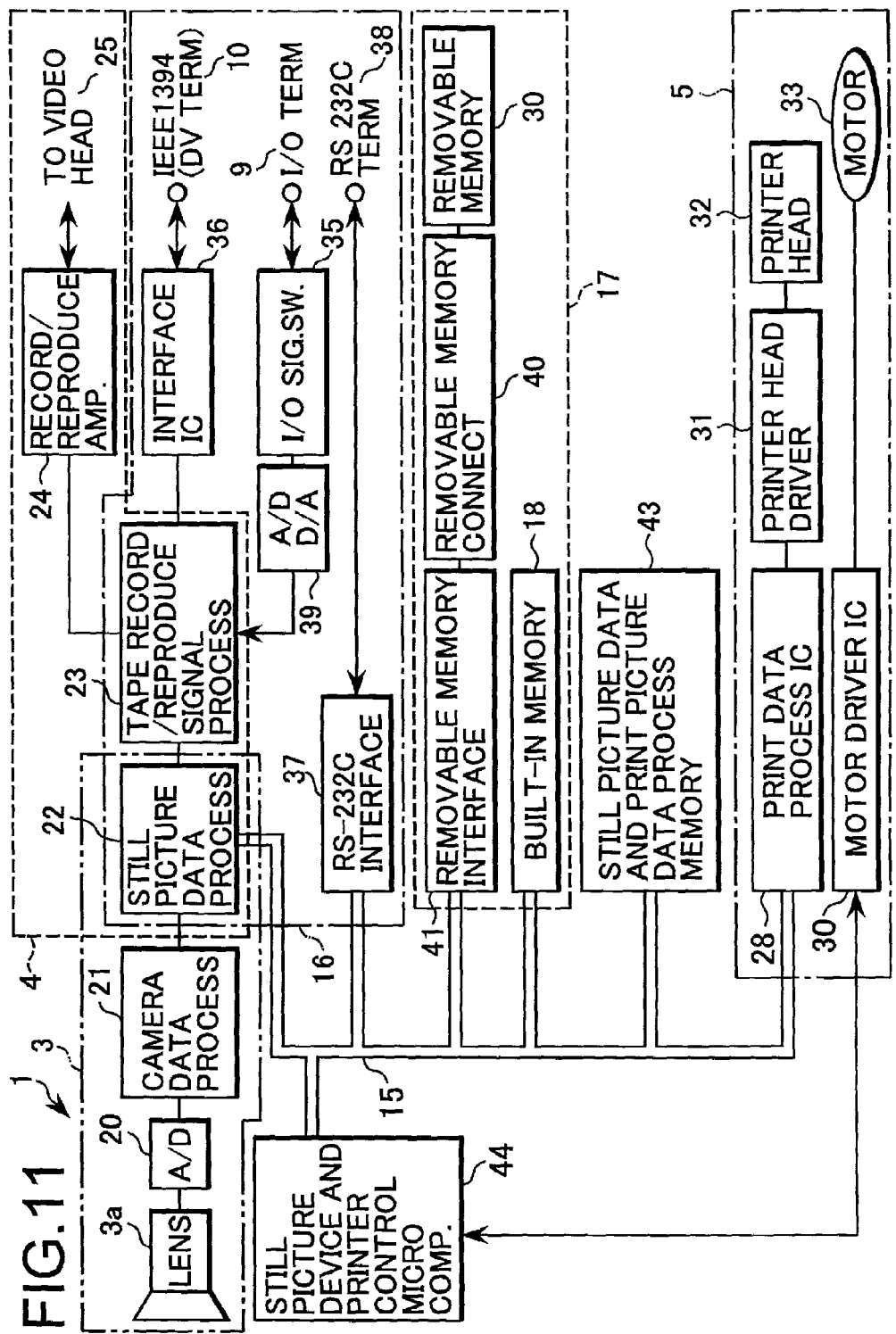
FIG. 11 is a schematic block diagram indicating a modification of the system configuration of FIG. 10.

Further, as shown in FIG. 11, a modification of FIG. 10 is contemplated, in which the still picture data memory 42 and the print picture data processing memory 28 are integrated into one still picture data/print picture data processing memory 43, and also the still picture device control micro-computer 34 and the printer control micro-computer 27 are integrated into one still picture device control/printer control micro-computer 44. Still further, the RS-232C interface 37 and the removable memory interface 41 is integrated into one integrated micro-computer (not shown).

Now, with reference to FIG. 12, a data flow during operation of respective units and portions in the camera-integrated VTR 1 having the above-mentioned configuration will be described.

Motion picture data taken and sent from the camera portion 3 is transferred along a data path indicated by an arrow A to the still picture data memory 42 to be stored therein. Playback motion pictures or still pictures from the VTR portion 4, or motion picture data entered from an external device via the I/O interface portion 16 other than the RS-232C connector 38 is transferred along a data path indicated by an arrow B to the still picture data memory 42. Motion picture data entered from the external device via the RS-232C connector 38 is transferred along a data path indicated by an arrow C to the still picture data memory 42. Still picture data from the built-in memory 18 which is in the RAM portion 17 is transferred along an arrow D to the still picture data memory 42. Still picture data from the removable memory 19 which is in the RAM portion 17 is transferred along a data path indicated by an arrow E to the still picture data memory 42. Incidentally, the above-mentioned arrows A and B also indicate data paths for still pictures to be captured from the motion pictures entered from the camera portion 3, the VTR portion 4 and the I/O interface portion 16.

Then, at the time of printing by the printer portion 5, a printing data (in RGB format) such as a still picture or the like is transferred from the still picture data memory 42 to the print picture data processing memory 28 along a data path indicated by an arrow F. The picture data in the print picture data processing memory 28 is converted to a print picture data (in CMY format) utilizing a vacant space therein, and it is transferred to a printer head 32 along a data path indicated by an arrow G to be printed on the printing sheet 12.

Figure 12:
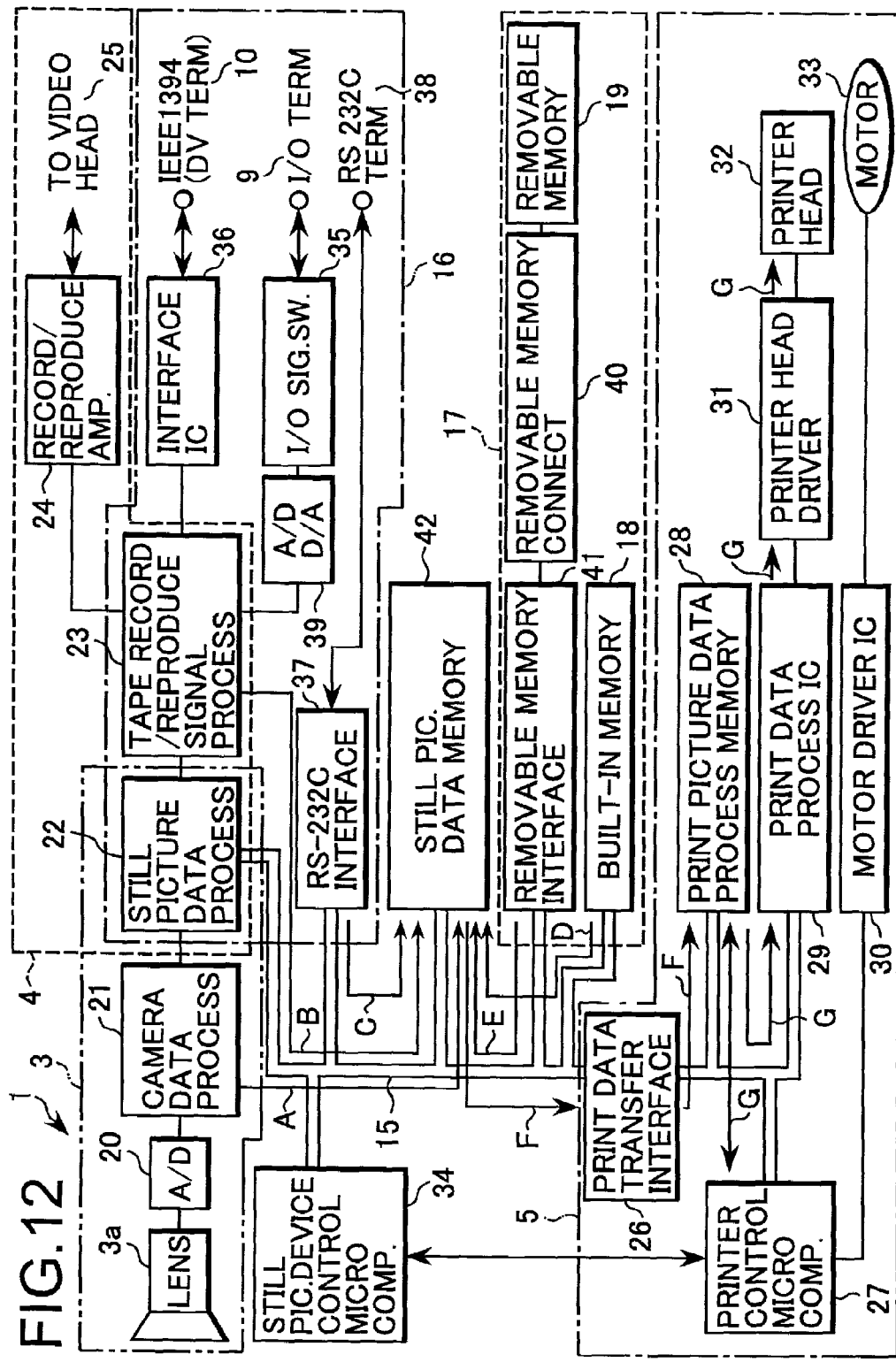
FIG. 12 is a schematic block diagram indicating data transfer paths between its camera portion, VTR portion, printer portion, I/O interface portion and RAM portion at the time of printing.
Figure 13:
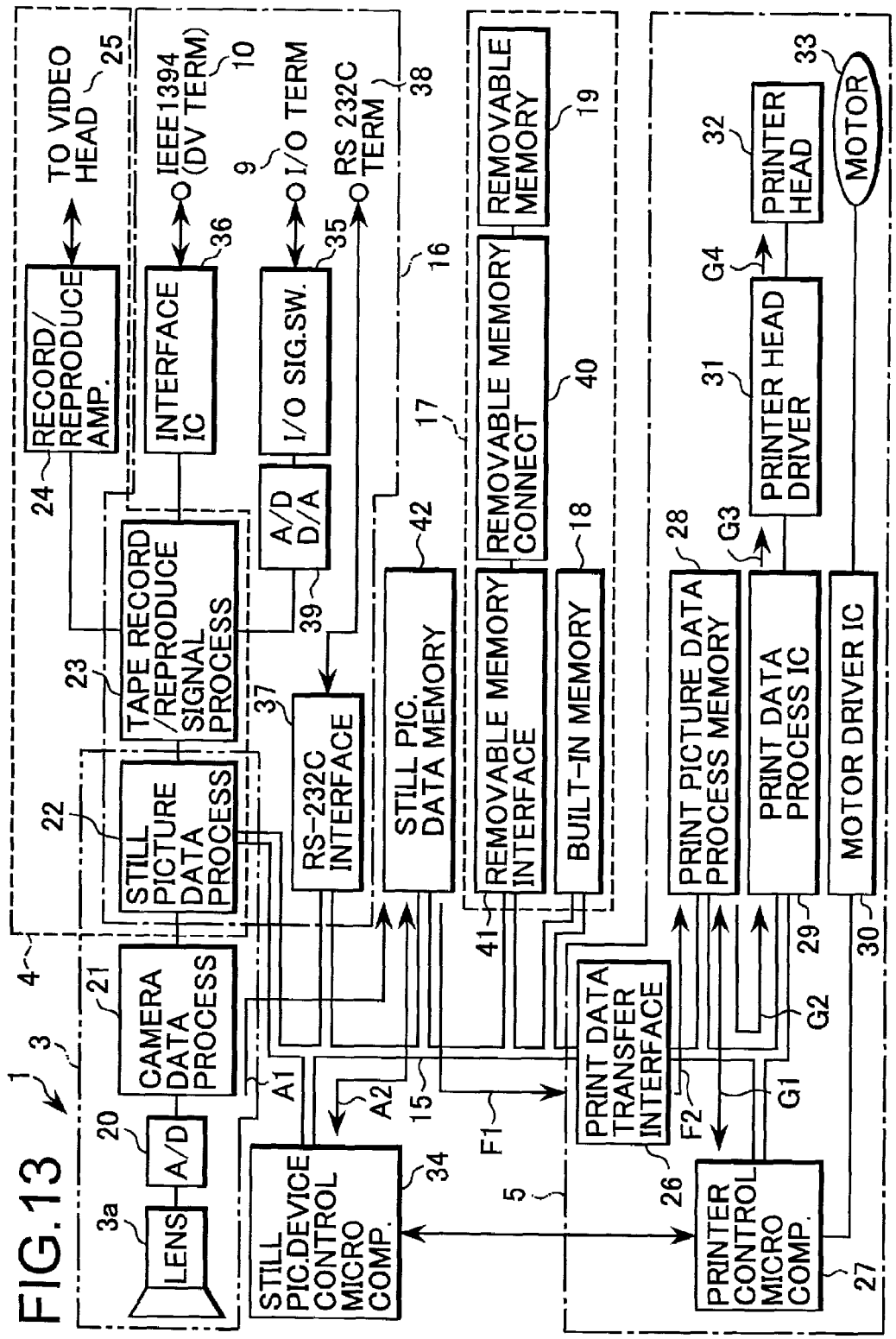
FIG. 13 is a block diagram showing a data transfer path between respective units at the time of printing a still image of motion pictures taken by the camera unit.

FIG. 13 shows more in detail the data paths indicated by the arrows A, F and G in FIG. 12 at the time of printing of the motion picture data transferred from the camera portion 3. The motion picture taken by the taking lens 3a is sent through the camera data processing circuit 21 and the still picture data processing circuit 22 and is entered in the still picture data memory 42 as a still picture data (as Y color difference signal at this stage) as indicated by an arrow A1. Then, this still picture data is converted into a RGB format with some processing of hues and the like added to in a processing step executed between the still picture data memory 42 and the still picture device control micro-computer 34 (refer to an arrow A2), and is transferred through the printing data transfer interface 26 to the print picture data processing memory 28 in the printer portion 5 (refer to arrows F1 and F2). The still picture data in RGB format transferred to the print picture data processing memory 28 is converted to a YMC format data by a processing executed between the printer control micro-computer 27 and therewith (refer to an arrow G1), is transferred to the print data processing IC 29 (an arrow G2), and after gamma correction processing for print, is transferred via the printer head driver 31 and the printer head 32 to be printed on the printing sheet 12 as indicated by arrows G3 and G4.

Figure 14:
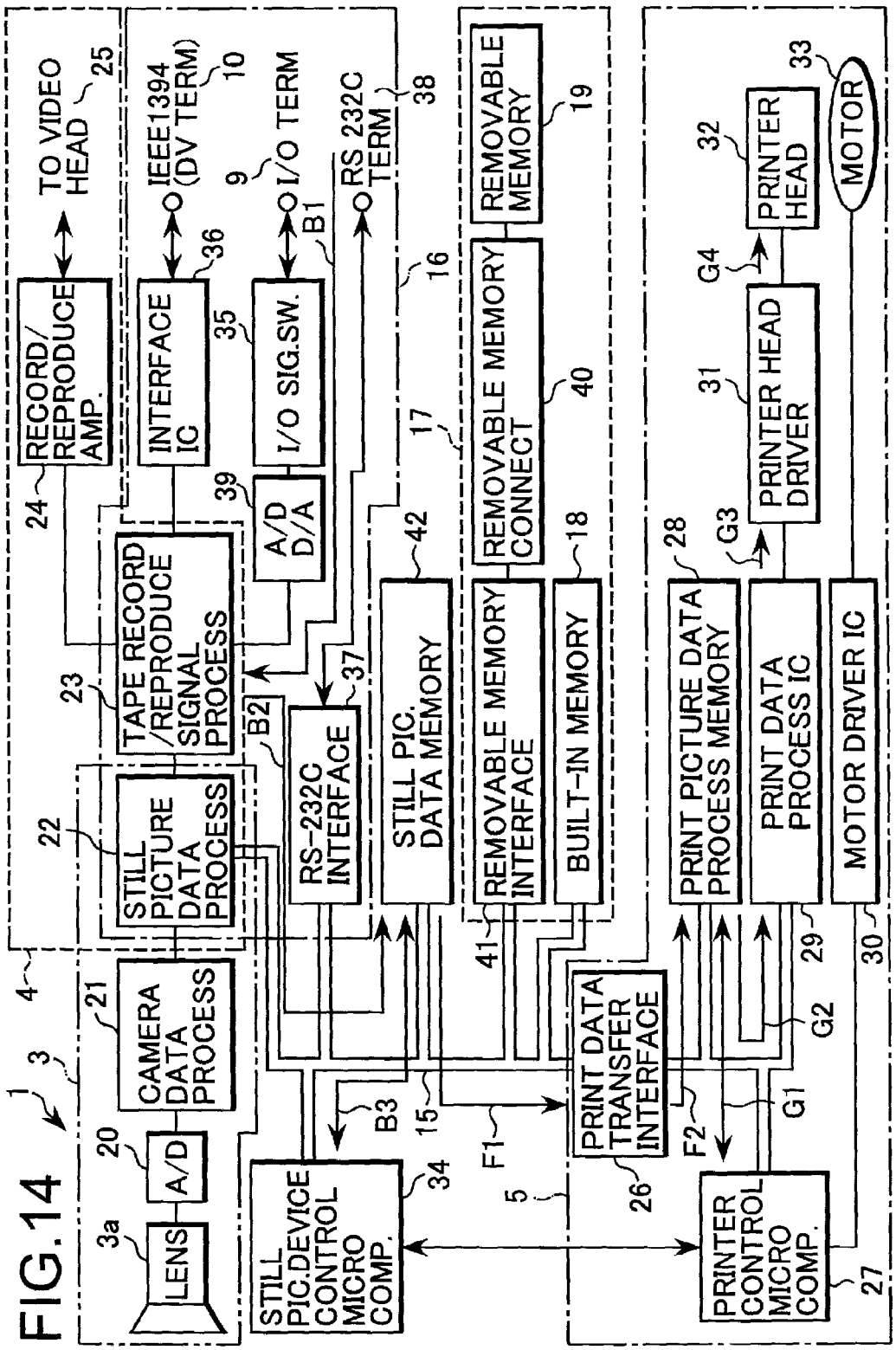
FIG. 14 is a block diagram showing a data transfer path at the time of printing pictures entered from an external device connected via a line I/O connector.

FIG. 14 shows more in detail the data paths indicated by arrows B, F and G in FIG. 12 at the time of printing of motion picture data from the external devices entered via the line I/O connector 9 which is in the I/O interface portion 16. The motion picture data from the external device is transferred via the input/output switch circuit 35 and the A/D•D/A converter 39 and entered into the tape recording/reproducing signal processing circuit 23 as indicated by arrow B1, and further, via the still picture data processing circuit 22, is transferred and entered into the still picture data memory 42 as a still picture data (Y color difference signal at this stage) as indicated by an arrow B2. Then, this still picture data is converted into RGB format with some correction of hues and the like added to in a processing executed between the still picture data memory 42 and the still picture device control micro-computer 34 (refer to arrow B3), and is transferred via the printing data transfer interface 26 to the print picture data processing memory 28 in the printer portion 5 as indicated by arrows F1 and F2. The still picture data (in RGB format) transferred to the print picture data processing memory 28 is converted to YMC format data by the data processing executed between printer control micro-computer 27 and therewith (refer to arrow G1), is transferred to the print data processing IC 29 as indicated by arrow G2, after the gamma correction processing for print, is transferred via the printer head driver 31 and the printer head 32 to be printed on the printing sheet 12 as indicated by arrows G3 and G4.

Figure 15:
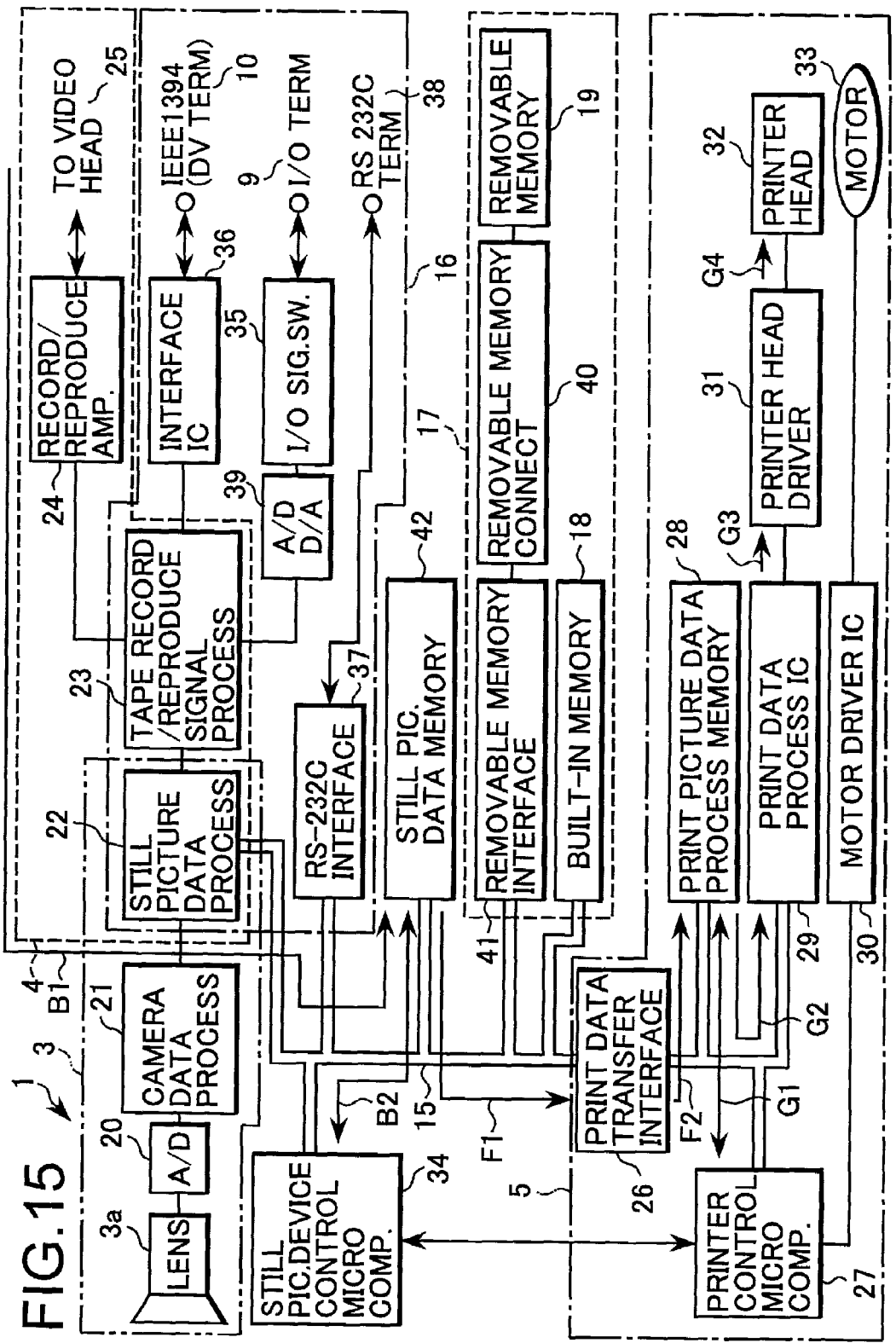
FIG. 15 is a block diagram showing a data transfer path at the time of printing a still picture image of video pictures reproduced by the VTR unit.

FIG. 15 shows more in detail the data paths indicated by arrows B, F and G in FIG. 12 at the time of printing of reproduced data of motion pictures or still pictures stored in the VTR portion 4, namely recorded on the video tape thereof. Reproduced data from the video tape is transferred via the video head 25, the record/reproduce amplifier 24, the tape record/reproduce signal processing circuit 23 and the still picture data processing circuit 22 to the still picture data memory 42 to be entered therein as a still picture data (as a Y color difference signal at this stage), as indicated by arrow B1. Then, this still picture data is converted to RGB format with some correction of hues and the like added to by a data processing executed between the still picture data memory 42 and the still picture device control micro-computer 34 (refer to arrow B2), then is transferred via the printing data transfer interface 26 to the print picture data processing memory 28 in the printer portion 5 as indicated by arrows F1 and F2. The still picture data (in RGB format) transferred to the print picture data processing memory 28 is converted to YMC format data by a data processing executed between the printer control micro-computer 27 and therewith (arrow G1), is transferred to the print data processing IC 29 (arrow G2), after a print gamma correction processing, is further transferred via the printer head driver 31 and the printer head 32 to be printed on the printing sheet 12 as indicated by arrows G3 and G4.

Figure 16:
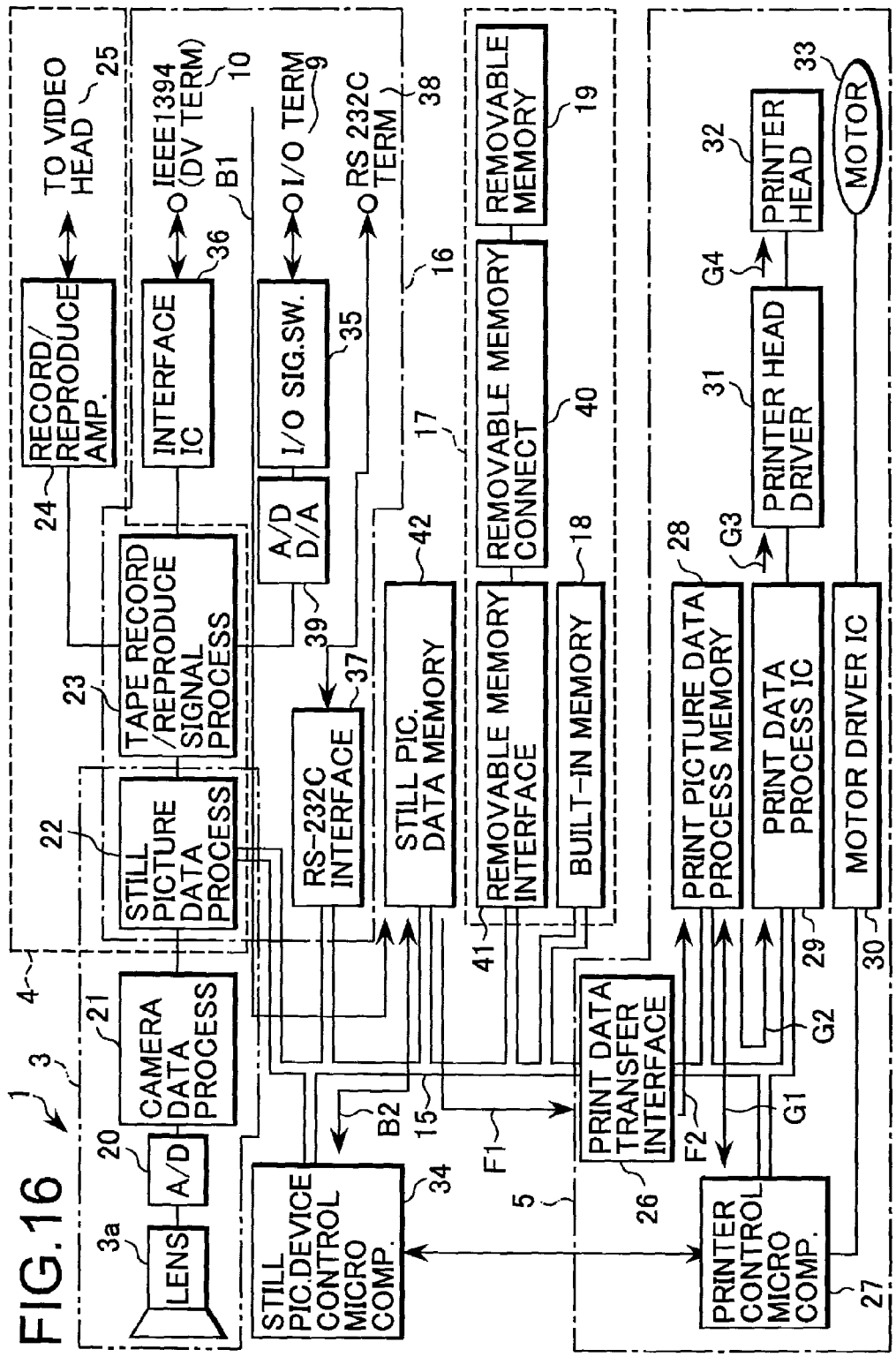
FIG. 16 is a block diagram showing a data transfer path at the time of printing a still picture image of video pictures entered from an external device connected via an IEEE-1394 connector.

FIG. 16 shows more in detail the data paths indicated by arrows B, F and G in FIG. 12 at the time of printing of motion picture data from the external devices entered via the IEEE-1394 connector 10 which is in the I/O interface portion 16. The motion picture data from the external device is transferred via the interface IC 36, the tape record/reproduce signal processing circuit 23 and the still picture data processing circuit 22 to the still picture data memory 42 to be entered as a still picture data (Y color difference signal in this stage) as indicated by arrow B1. Then, this still picture data is converted to a RGB format with some correction of hues and the like added to by a data processing executed between the still picture data memory 42 and the still picture device control micro-computer 34 (arrow B2), and is transferred via the printing data transfer interface 26 to the print picture data processing memory 28 in the printer portion 5 (arrows F1 and F2). The still picture data (RGB format) transferred to the print picture data processing memory 28 is converted to YMC format data by a data processing executed between the printer control micro-computer 27 and therewith (arrow G1), is transferred to the print data processing IC 29 (arrow G2), and after a print gamma correction processing, transferred via the printer head driver 31 and the printer head 32 to be printed on the printing sheet 12 as indicated by arrows G3 and G4.

Figure 17:
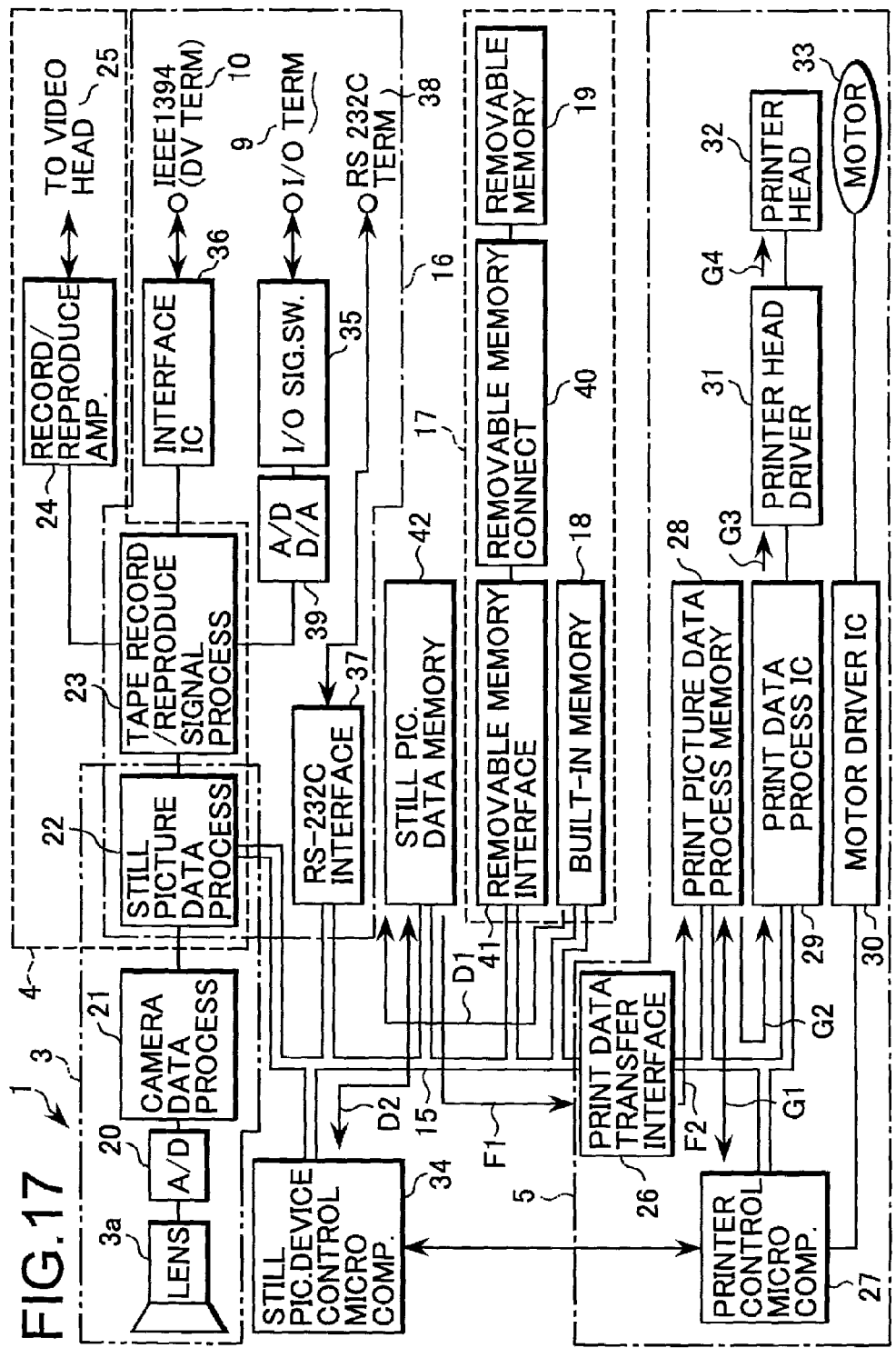
FIG. 17 is a block diagram showing a data transfer path at the time of printing a still picture image of video pictures stored in the built-in memory.

FIG. 17 shows more in detail the data paths indicated by arrows D, F and G in FIG. 12 at the time of printing of picture data of still pictures or motion pictures stored in the built-in memory 18 in the RAM portion 17. The picture data of still pictures or motion pictures stored in the built-in memory 18 is directly entered into the still picture data memory 42 as a still picture data (as Y color difference signal at this stage) as indicated by arrow D1. Then, this still picture data is converted to a RGB format with some correction of hues and the like added to by a data processing executed between the still picture data memory 42 and the still picture device control micro-computer 34 (arrow D2), and is transferred via the printing data transfer interface 26 to the print picture data processing memory 28 in the printer portion 5 (arrows F1 and F2). The still picture data (in RGB format) transferred to the print picture data processing memory 28 is converted to YMC format data by a data processing executed between the printer control micro-computer 27 and the same (arrow G1), is transferred to the print data processing IC 29 (arrow G2), after print gamma correction processing, further transferred via the printer head driver 31 and the printer head 32 to be printed on the printing sheet 12 (arrows G3 and G4).

Figure 18:
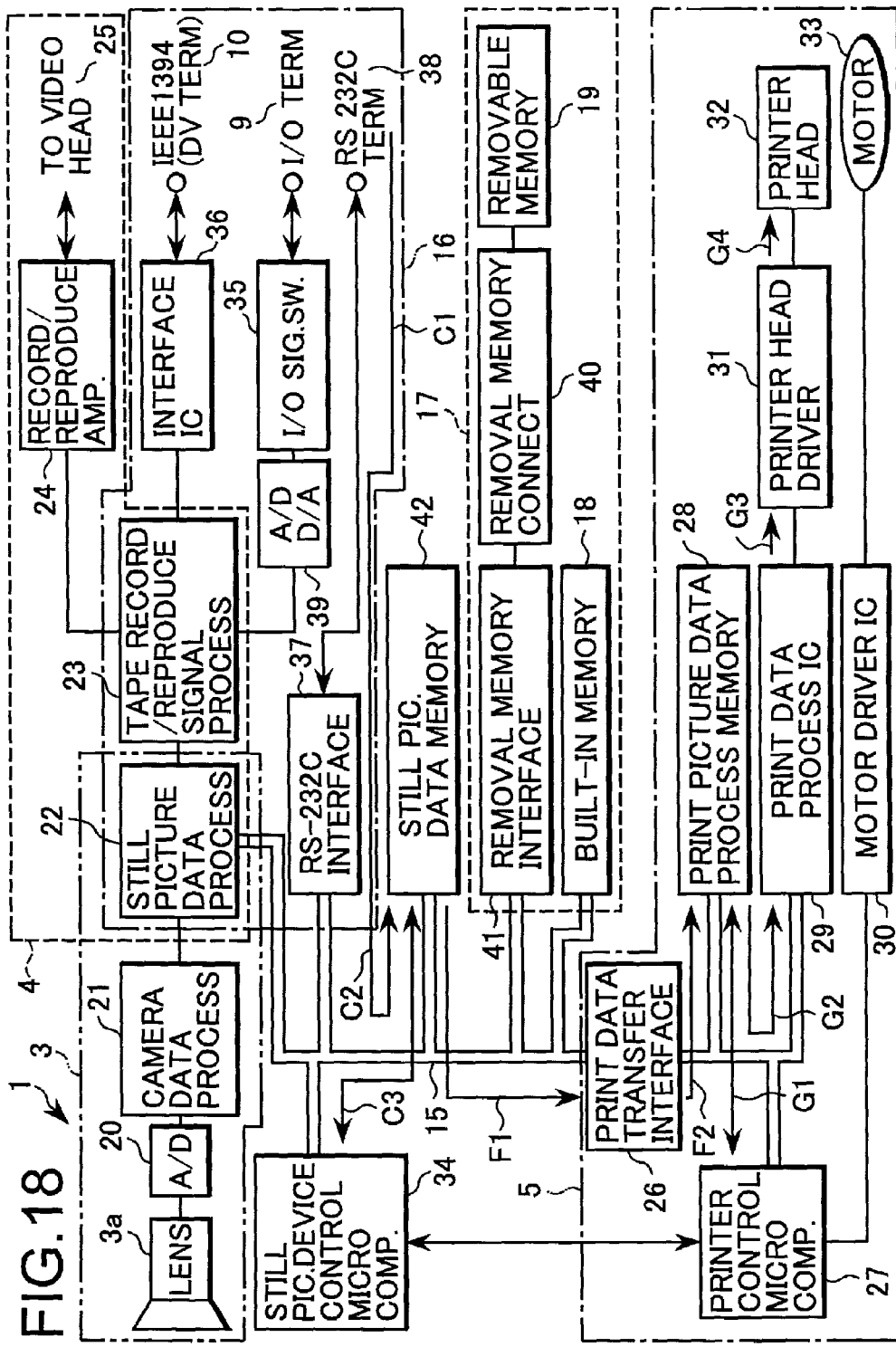
FIG. 18 is a block diagram showing a data transfer path at the time of printing a still picture image of video pictures entered from an external device connected via a RS-232C connector.

FIG. 18 shows more in detail the data paths indicated by arrows C, F and G in FIG. 12 at the time of printing of motion picture data from the external devices entered via the RS-232C connector 38 which is a member of the I/O interface portion 16. The motion picture data entered via the RS-232C connector 38 from the external device is transferred via the RS-232C interface 37 to the still picture data memory 42 to be entered as a still picture data (as Y color difference signal at this stage) as indicated by arrows C1 and C2. Then, this still picture data is converted to RGB format with some correction of hues and the like added to by a data processing executed between the still picture data memory 42 and the still picture device control micro-computer 34 (arrow C3), and is transferred via the printing data transfer interface 26 to the print picture data processing memory 28 in the printer portion 5 (arrows F1 and F2). The still picture data (in RGB format) transferred to the print picture data processing memory 28 is converted to YMC format data by a data processing executed between the printer control micro-computer 27 and therewith (arrow G1), is transferred to the print data processing IC 29 (arrow G2), after print gamma correction processing, transferred via the printer head driver 31 and the printer head 32 to be printed on the printing sheet 12 (arrows G3 and G4).

Figure 19:
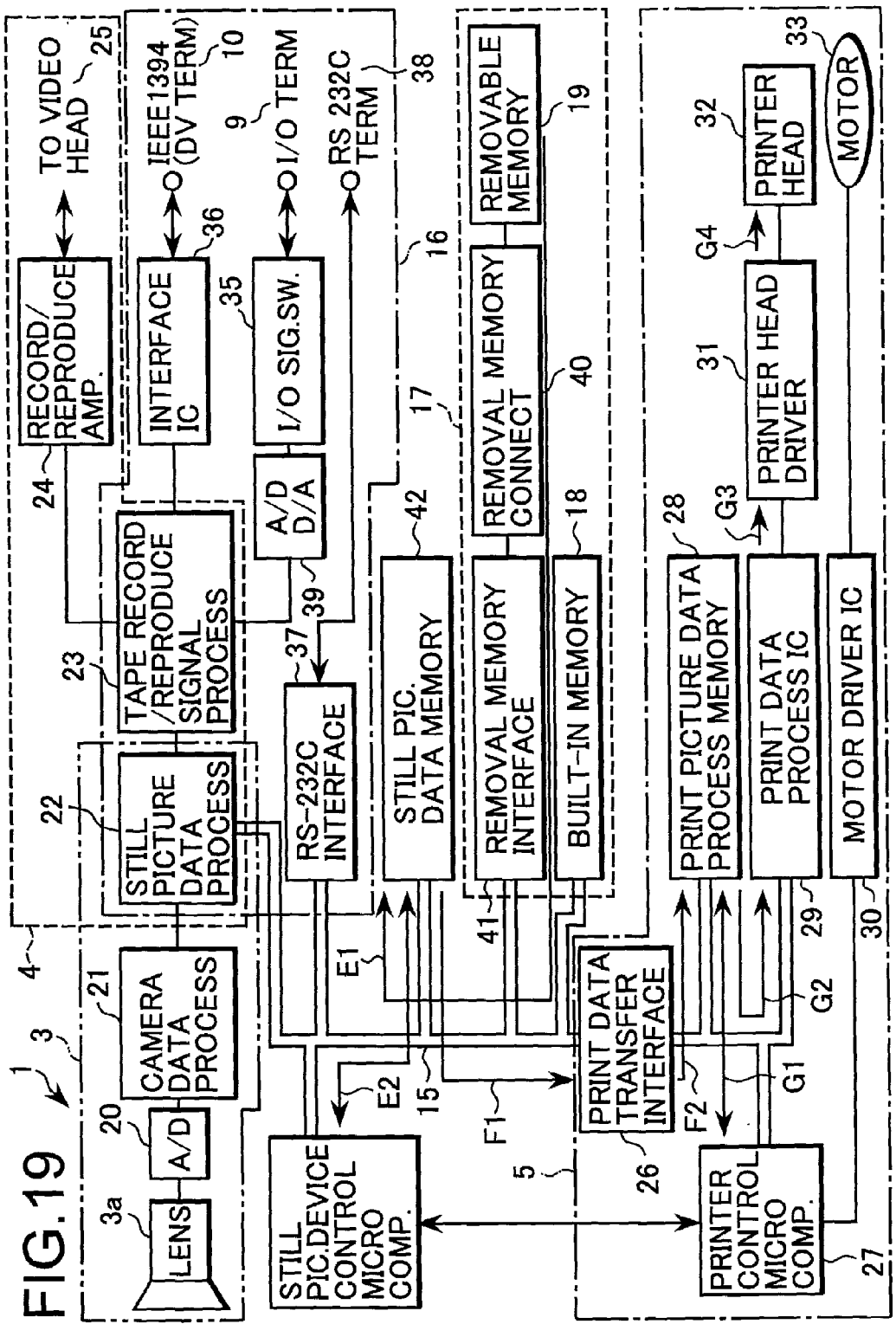
FIG. 19 is a block diagram showing a data transfer path at the time of printing a still picture image of video pictures entered from a removable memory.

FIG. 19 shows more in detail the data paths indicated by arrows E, F and G in FIG. 12, at the time of printing of picture data of still pictures or motion pictures stored in the removable memory 19 which is a member of the RAM portion 17. The picture data of still pictures or motion pictures stored in the removable memory 19 is transferred via the removable memory connector 40 and the removable memory interface 41 to the still picture data memory 42 to be entered as a still picture data (Y color difference signal at this stage) as indicated by arrow E1. Then, this still picture data is converted to RGB format data with addition of some corrections of hues and the like by a data processing performed between the still picture data memory 42 and the still picture device control micro-computer 34 (arrow E2), and is transferred via the printing data transfer interface 26 to the print picture data processing memory 28 in the printer portion 5 (arrows F1 and F2). The still picture data (in RGB format) transferred to the print picture data processing memory 28 is converted to YMC format data by a data processing performed between the printer control micro-computer 27 and therewith (arrow G1), is transferred to the print data processing IC 29 (arrow G2), and after print gamma correction processing, further transferred via the printer head driver 31 and the printer head 32 to be printed on the printing sheet 12 (arrows G3 and G4).

Figure 20:
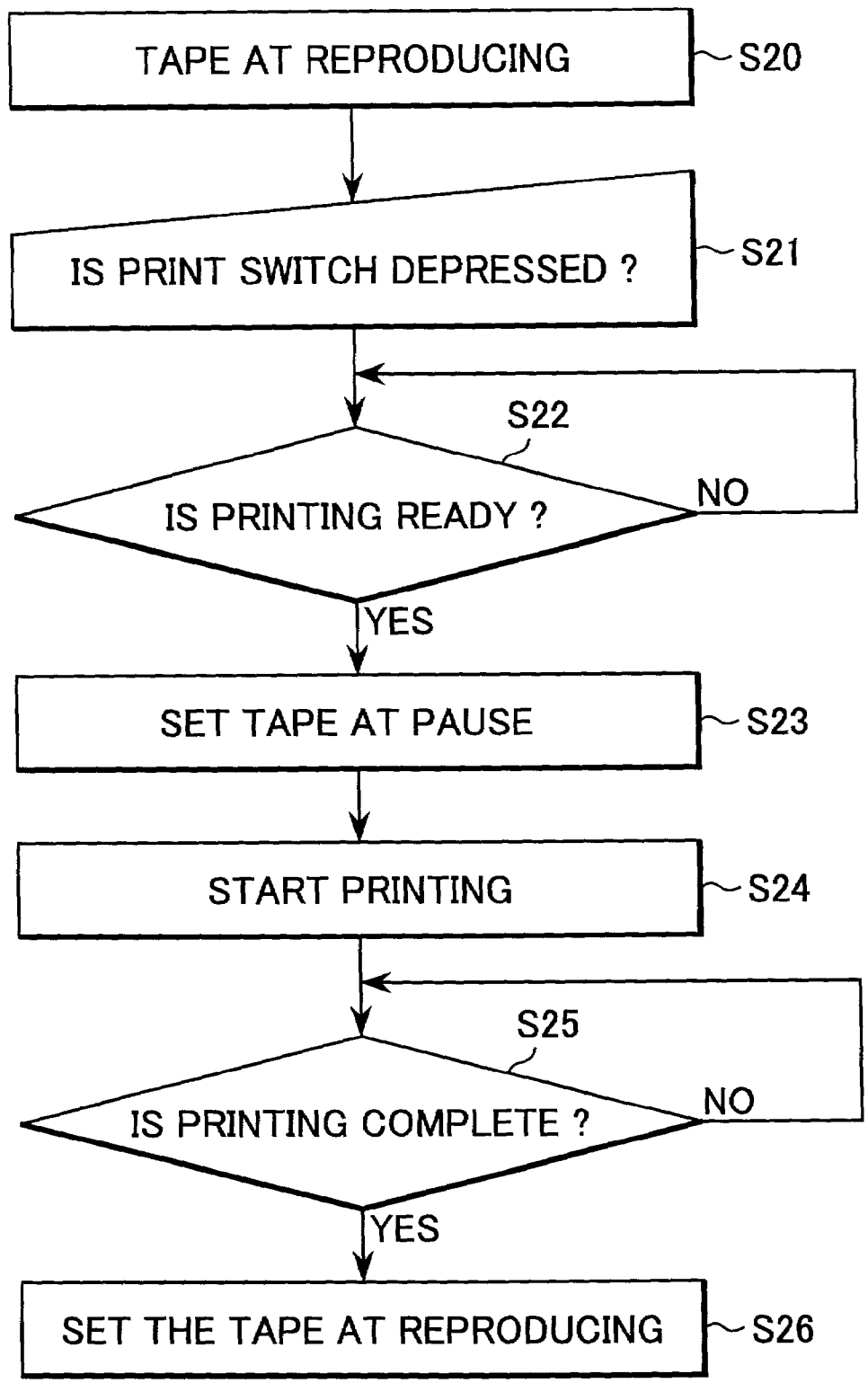
FIG. 20 is a flowchart showing sequences of operation for printing a still picture selected from motion pictures reproduced by the VTR unit.

FIG. 20 shows an example of process flowcharts at the time of printing in the printer portion 5 in the case of FIG. 15, namely, at the time of printing of a portion of playback motion pictures by the printer 5 while the motion picture data recorded on the video tape are being reproduced in the VTR portion 3.

Namely, in step S20 while the video tape is at playback, when the user finds a scene and wishes to have it printed, the user presses the print switch 11 (step S21). At first it is confirmed if the print portion 5 is ready to start printing (step S22). Then, if it is ready, playback of the video tape in the VTR section 3 is paused (step S23), and a still picture data of the scene is transferred along the data path indicated by the arrow B in FIG. 12 to the still picture data memory 42 to be entered therein. Then, its picture data is transferred along the data paths indicated by arrows F and G in FIG. 12 to the printer portion 5, and printing thereof on the printing sheet 12 is started (step S24). Finally, it is determined if printing is completed (step S25), and if it is completed, the pause state of the video tape in the VTR portion 3 is released to resume its playback (step S26).

As described heretofore, according to one feature of the camera-integrated VTR 1 embodying the data processing device of the invention, the picture data being taken by the camera unit 3 or being entered via the I/O interface 16 from the external device, both are members of the I/O units, is enabled to be processed instantaneously as a still picture in the printer unit 5 embodying the data processing unit of the invention, without use of any additional recording medium interposed therebetween, namely, without need of recording these picture data in a recording medium such as a video tape or the like.

Further, according to another feature of the camera-integrated VTR 1 embodying the invention, a still picture of a scene the user is interested in among various picture data of still pictures and/or motion pictures stored in the built-in (inside) memory 18 and the removable memory 19 in the RAM portion 17 which is the data memory unit of the invention is also enabled to be selected and processed instantaneously in the printer unit 5 as a still picture without use of any additional recording medium.

Still further, according to still another feature of the camera-integrated VTR 1 embodying the invention, a still picture data of a scene the user is interested in among various picture data of still pictures and/or motion pictures recorded on the video tape in the VTR portion 3 which is the data memory unit of the invention is also enabled to be selected and processed instantaneously in printer unit 5 as a still picture without use of additional recording medium.

Furthermore, according to still more feature of the camera-integrated VTR 1 embodying the invention, a still picture data of an arbitrary portion of the still pictures and/or the motion pictures the user is interested in among those stored in the external devices such as a personal computer which is connected with the camera-integrated VTR 1 of the invention is enabled to be entered to the camera-integrated VTR 1 via the I/O interface portion 16 in the data I/O unit, and to be processed instantaneously as a still picture in the printer section 5 in the data processing unit of the invention without use of additional recording medium.

In the above description of the camera-integrated VTR 1, the I/O interface portion 16 as the data I/O unit is specified to be the standard connections for data exchange implemented by means of wiring, i.e., using cables, however, it is not limited thereto, and any other standard connections by means of wireless or infrared communication without using wiring or cables may be also employed within the scope of the invention, thereby eliminating troublesome wiring operation and allowing instantaneous processing of the still pictures by the printer unit 5.

Still further, in the camera-integrated VTR 1 of the invention, utilizing a unique arrangement of respective units and functions described above, it is enabled, for example, at the time of printing of a portrait intentionally to enhance a skin hue or skin color from the background. Such an enhancement processing can be done as included in the normal data processing of the still picture data stored in the still picture data memory 42, which is to be executed between the still picture data memory 42 and the still picture device control micro-computer 34.

Still more, it is also possible to print a picture data with a picture frame added to. This is enabled by operations comprising the steps of: storing a picture frame data in advance in a part of the removable memory 19 or the built-in memory 18; combining this frame data with a still picture data entered into the still picture data memory 42 from the camera portion 3, the VTR portion 4, the I/O interface portion 16, and the RAM portion 17 using the still picture device control micro-computer 34 or the like; then again storing this combined still picture data in the removable memory 19 or the built-in memory 18 in the RAM unit 17; and printing the same by the normal process as desired.

Further, the camera-integrated VTR 1 including the printer mechanism according to the invention has such an additional advantage in comparison with a still picture video camera (so-called digital still camera) that because this camera-integrated VTR 1 of the invention can print instantaneously any portion or scene of motion pictures currently being taken or being reproduced later from the video tape or the like whenever the operator wants to have it printed as a still picture, the user needs not to be alert always aiming at a single best camera scene as required for the still picture video camera, can keep shooting camera at ease, and then select and print the best scene later pondering with ample time spent.

As described heretofore, according to the camera-integrated VTR 1 embodying the data processing device of the invention, the very complicated and troublesome cable connections conventionally required for establishing connection between the camera-integrated VTR 1 and a separate printer unit, separate power cable connections therefor, and tedious print picture data handling are eliminated, thereby enabling for the various picture data from the data I/O units (the camera portion 3 and the I/O interface portion 16) and the data store units (the VTR portion 4 and the RAM portion 17) to be printed in data process unit (printer unit 5) by a simple operation of the user, for example, merely by pressing the print switch 11.

Further, the forms and structures of respective units and portions described specifically with respect to the embodiments of the invention are not limited thereto, and any modifications thereof should be construed to be within the scope of the invention.

What is claimed is:

1. A data processing device comprising:
   a data input/output unit;
   a data memory unit including a video recorder portion; and
   a data processing unit including a printer unit for printing picture data,
   wherein said data input/output unit, said data memory unit and said data processing unit are housed in a single housing and are connected in parallel to a data bus so as to allow for a data exchange to be executed selectively and directly between respective units without need of interposing any additional unit, and
   wherein said data input/output unit includes means for selecting still picture data, from among a series of moving motion picture data, to allow printing of said still picture data through said printing unit.

2. The data processing device according to claim 1, wherein
   said data input/output unit includes a camera unit for taking a picture; and
   picture data obtained by said camera unit is transferred via the data bus and is instantaneously entered as a still picture to be printed in said printer unit.

3. The data processing device according to claim 1, wherein
   said data input/output unit includes an input/output interface portion for entering external data;
   said data processing unit includes a printer portion for printing data; and
   said external data entered via said input/output interface portion is transferred via said data bus to be instantaneously entered as a still picture and printed by said printer portion.

4. The data processing device according to claim 1, wherein
   any part of motion pictures recorded on a video recording medium in said video recorder portion is transferred via the data bus to be instantaneously entered as a still picture and printed in said printer portion.

5. The data processing device according to claim 1, wherein
   said data input/output unit further including an input/output interface portion for exchanging data with an external device; and
   an external data from an external device entered via said input/output interface portion is allowed instantaneously to be printed in said printer portion.

6. The data processing device according to claim 1, wherein
   the video recorder portion is a video tape recorder;
   said data input/output unit includes a camera portion for taking a picture and an input/output interface portion;
   said data memory unit includes a built-in memory and a removable memory;
   said data processing unit includes a printer portion for printing data and a picture display portion for displaying data as a picture; and
   data entered from said data input/output unit and/or from said data memory unit is transferred selectively via the data bus to be instantaneously entered as a still picture and printed in said printer portion.

* * * * *